(12) United States Patent
Nakahara

(10) Patent No.: US 6,571,301 B1
(45) Date of Patent: *May 27, 2003

(54) MULTI PROCESSOR SYSTEM AND FIFO CIRCUIT

(75) Inventor: Makoto Nakahara, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,842

(22) Filed: May 5, 1999

(30) Foreign Application Priority Data

Aug. 26, 1998 (JP) .......................................... 10-239314
Aug. 26, 1998 (JP) .......................................... 10-240792

(51) Int. Cl.[7] .............................................. G06F 13/00
(52) U.S. Cl. ............................................ 710/31; 712/1
(58) Field of Search ......................... 712/1; 711/100, 711/109; 710/2, 12, 31, 38, 51, 308

(56) References Cited

U.S. PATENT DOCUMENTS

| 4,667,287 A | | 5/1987 | Allen et al. ................. 709/234 |
| 5,262,997 A | * | 11/1993 | Lee ............................. 365/221 |
| 5,295,246 A | * | 3/1994 | Bischoff et al. ............... 710/34 |
| 5,774,698 A | * | 6/1998 | Olnowich ..................... 370/366 |
| 5,812,799 A | * | 9/1998 | Zuravleff ...................... 710/128 |
| 5,822,770 A | * | 10/1998 | Shim ........................... 711/154 |
| 5,961,626 A | * | 10/1999 | Harrison ...................... 710/129 |
| 5,968,135 A | * | 10/1999 | Teramoto ..................... 709/400 |
| 6,072,781 A | * | 6/2000 | Feeney et al. ............... 370/229 |

FOREIGN PATENT DOCUMENTS

| JP | 59-132263 | 7/1984 |
| JP | 63-257052 | 10/1988 |
| JP | 1-309161 | 12/1989 |

* cited by examiner

Primary Examiner—Eric Coleman
(74) Attorney, Agent, or Firm—Staas & Halsey LLP

(57) ABSTRACT

A multi processor system includes a first processor having a data input terminal and a data output terminal, which first processor is programmed so as to decide destinations to which data items successively input from an input terminal thereto should be delivered and deliver the input data items to the decided destinations, and a plurality of second processors, each of which has a data input terminal and a data output terminal and is programmed so to execute a predetermined process on data items delivered from the first processor. A FIFO circuit includes a memory portion, a write pointer assigned to a first master; and a plurality of read pointers each of which is assigned to one of a plurality of second masters.

23 Claims, 16 Drawing Sheets

FIG.6

| PROCESSOR 20 | PROCESSOR 27 |
|---|---|
| ⇩ | ⇩ |

| start: SYNCff | start: SYNCfe |
| #1 | #2 |

```
mov   r0, ofifo        add   ififo, r15
mov   r1, ofifo        add   ififo, r14
mov   r2, ofifo        add   ififo, r13
  . . .                add   ififo, r12
                       add   ififo, r11
FIFOup
                         . . .
  . . .

b, start               b, start
nop                    FIFOdn
```

FIG.7

| EVENT | | PROCESSOR 20 | PROCESSOR 27 | |
|---|---|---|---|---|
| 1 | WAIT FOR FIFO TO B RELEASED FROM FULL | SYNCff | | |
| 2 | | #1 | | |
| 3 | | | | |
| 4 | RELEASE WAITING | mov r0, ofifo | | |
| 5 | | mov r1, ofifo | | |
| 6 | | mov r2, ofifo | | |
| | | ... | FIFOdn | FIFO COUNTER-1 DATA REQUEST |
| 7 | FIFO COUNTER +1 COMPLETE DATA TRANSMISSION | FIFOup | SYNCfe | WAIT FOR FIFO TO BE RELEASED EMPTY |
| 8 | | | #2 | |
| 9 | | ... | add ififo, r15 | RELEASE WAITING |
| 10 | | | add ififo, r14 | |
| 11 | | | add ififo, r13 | |
| 12 | | | add ififo, r12 | |
| | | | add ififo, r11 | |
| | | | ... | |

MULTI PROCESSOR SYSTEM AND FIFO CIRCUIT

BACKGROUND OF THE INVENTION

1. Field of the Invention

The present invention relates to a multi processor system which is a computer system having a plurality of processors and to a FIFO circuit applicable to the multi processor system.

2. Description of the Related Art

Computers are always required to have high-speed operations and high performance. In order to implement the requirements, parallel processing of a plurality of instructions is adopted. There are, as typical methods of parallel processing, a method in which the number of instructions which can be processed in parallel by a single processor is increased and a method in which a plurality of processors are used so that the number of instructions which can be processed in parallel is increased.

The multi processor system having a plurality of processors has been implemented in a large scale computer system such as a super computer. The number of processors is increased to improve the performance of the multi processor system. Thus, a type of multi processor system in which the number of processors can be easily increased is in the mainstream.

An example of a conventional multi processor system is formed as shown in FIG. 1. Referring to FIG. 1, the multi processor system has processors 1-1, 1-2, ..., 1-n, a bus 2 and a shared memory 3. The bus 2 is connected with the plurality of processors 1-1, 1-2, ..., 1-n and the shared memory 3 which is shared by the processors 1-1, 1-2, ..., 1-n.

Another example of a conventional multi processor system is formed as shown in FIG. 2. Referring to FIG. 2, the multi processor system has processors 4-1, 4-2, ..., 4-n and a crossbar network 5. The processors 4-1, 4-2, ..., 4-n are coupled to each other via crossbar switches in the crossbar network 5.

In the conventional multi processor system as shown in FIG. 1, when a request for delivery of data between two processors and a request for delivery of data between two other processors are issued, the data delivery operations in response to the requests are mediated so that one of the data delivery operations is awaited. Thus, the data can not be processed at a high speed.

In addition, as to data transmission, the data is transmitted via the bus 2 always. Thus, a bus transaction in which data is transmitted after a bus right is obtained is needed. From this viewpoint, also, the high speed data processing deteriorates.

In the conventional multi processor system as shown in FIG. 2, as far as processors do not conflict with each other on a crossbar switch used to connect to other processors, the wait for the data delivery operation does not occur. However, if processors conflict with each other on a crossbar switch, one of the data delivery operations is awaited in the same manner as in the case of the multi processor system shown in FIG. 1. This matter prevents data from being processed at a high speed.

In addition, since a large number of crossbar switches have to be provided in the crossbar network 5, the circuitry structure of the system is complex. The data must be transmitted via crossbar switches. From this viewpoint, also, the high speed data processing is prevented.

SUMMARY OF THE INVENTION

Accordingly, a general object of the present invention is to provide a novel and useful multi processor system in which the disadvantages of the aforementioned prior art are eliminated.

A specific object of the present invention is to provide a multi processor system by which data can be processed at a high speed.

Another object of the present invention is to provide a multi processor system having a simplified circuitry structure.

The above objects of the present invention are achieved by a multi processor system comprising: a first processor, having a data input terminal and a data output terminal, which first processor is programmed so as to decide destinations to which data items successively input from an input terminal thereto should be delivered and deliver the input data times to the decided destinations; and a plurality of second processors, each of which has a data input terminal and a data output terminal and is programmed so as to execute a predetermined process for data delivered from the first processor.

According to the multi processor system of the present invention, the plurality of second processors can execute processes in parallel. Since input data items are delivered from the first processor to the plurality of second processors, it is not necessary for the multi processor system to provide a bus shared by the plurality of second processors as shown in FIG. 1 or provide a crossbar network as shown in FIG. 2.

As a result, there is no case in which each of the second processors is waiting for the data transmission operation. In addition, a procedure for obtaining the bus right is not needed.

A further object of the present invention is to provide a FIFO circuit in which data items used by a master can be reused by another master without spoiling a function, of a FIFO, that data items input thereto are output in the inputting order.

The above object of the present invention is achieved by providing a FIFO circuit comprising: a memory portion; a write pointer assigned to a first master; and a plurality of read pointers each of which is assigned to one of a plurality of second masters.

In the FIFO circuit according to the present invention, write and read operations with respect to the memory portion may be executed under a condition in which an address specified by the first master using the write pointer does not exceed an address specified by one of the plurality of second masters using a corresponding one of the plurality of read pointers which one executes a read operation for each of data items in the memory portion last. In this case, the data items can be used by the plurality of second masters. Thus, the data items in the memory portion can be reused without spoiling a function, as the FIFO, that data items input thereto are output in the inputting order.

BRIEF DESCRIPTION OF THE DRAWINGS

Other objects, features and advantages of the present invention will be apparent from the following description when read in conjunction with the accompanying drawings, in which:

FIG. 6 is a diagram illustrating programs installed in processors of the multi processor system shown in FIG. 4;

FIG. 7 is a diagram illustrating operations of the multi processor system shown in FIG. 4;

DESCRIPTION OF THE PREFERRED EMBODIMENTS

A description will be given, with reference to the drawings, of embodiments of the present invention.

Figure 3:
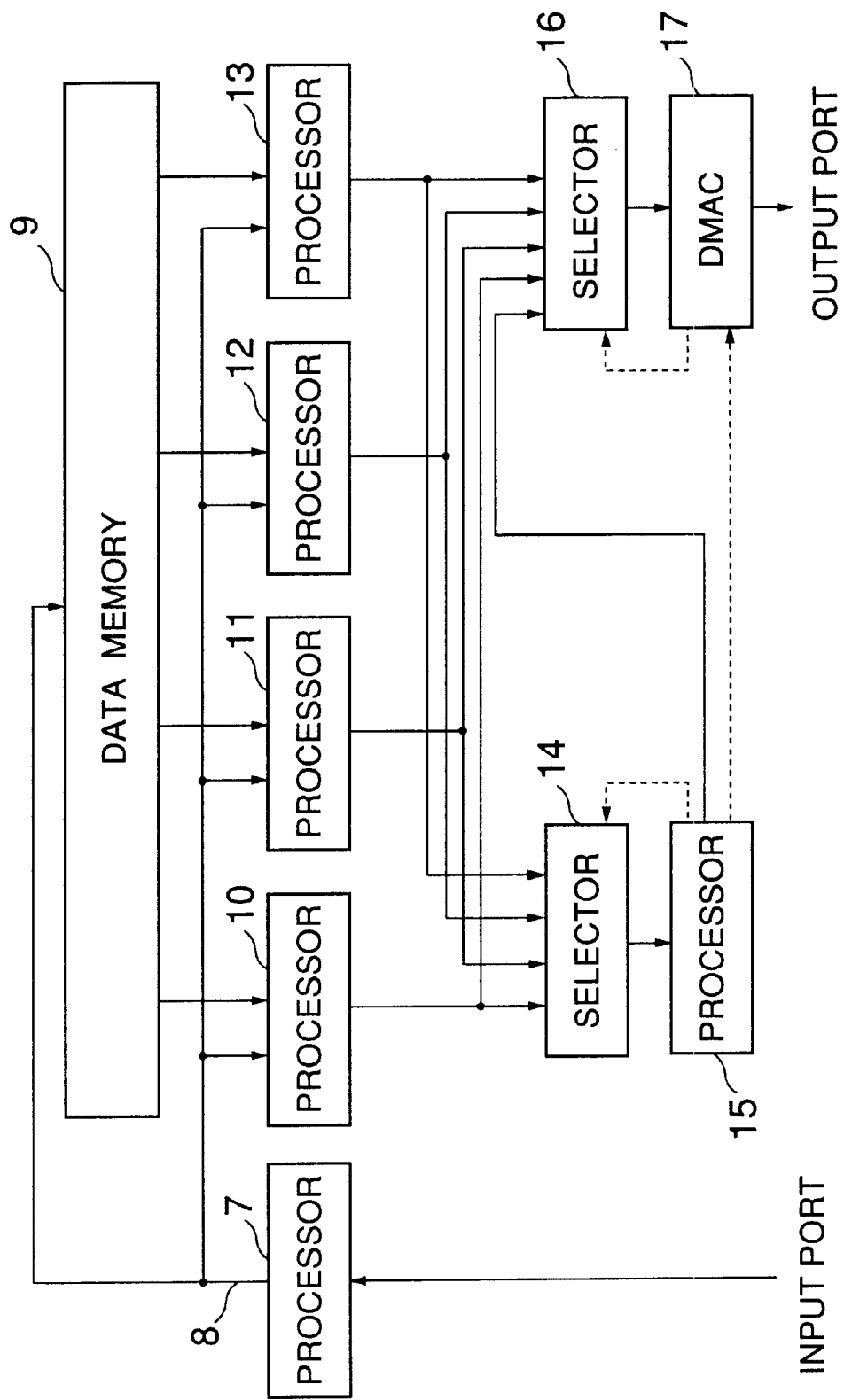
FIG. 3 is a block circuitry diagram illustrating a multi processor system according to a first embodiment of the present invention.

A multi processor system according to a first embodiment of the present invention is formed as shown in FIG. 3. Referring to FIG. 3, the multi processor system has processors 7, 10–13 and 15. The processor 7 has data input terminals and data output terminals and is programmed so as to decode commands included in input data formed of packets successively supplied through an input port, determine a destination and deliver the input data to the destination (in this embodiment, one of a data memory 9 and the processors 10–13).

A dedicated bus 8 is used, by the processor 7, to deliver the input data. The processor 7 is programmed so as to deliver the input data to the data memory 9 when the input data is predetermined data (in this embodiment, data to be accessed, by one of the processors 10–13, to process the input data delivered by the processor 7).

In addition, each of the processors 10–13 has data input terminals and data output terminals. The data input terminals of each of the processors 10–13 are connected to the dedicated bus 8. Each of the processors 10–13 is programmed so as to access the data stored in the data memory 9 according to the necessity and process the input data delivered by the processor 7. Each of the processors 10–13 has a buffer memory used to set therein output data obtained by processing the input data.

A selector 14 is controlled by the processor 15. The selector 14 selects one of the output data items from the processors 10–13. The processor 15 having data input terminals and data output terminals controls the selector 14 so as to receive one of the output data items from the processors 10–13 via the selector 14. The processor 15 is programmed so as to process the data received via the selector 14 and supplies to a DMA (Direct Memory Access) controller 17 an instruction indicating which output data item out of those from the processors 10–13 and 15 should be transmitted to the output port.

A selector 16 is controlled by the DMA controller 17 so as to select one of the output data items from the processors 10–13 and 15. The DMA controller 17 which controls the selector 16 transmits an output data item, as instructed by the processor 15, to the output port.

In the multi processor system having the structure as described above, the processor 7 decodes commands included in input data items successively input and determines destinations. The processor 7 then delivers, based on the determination result, each of the input data items to one of the data memory 9 and the processors 10–13. When receiving the input data from the processor 7, the each of the processors 10–13 executes a predetermined process for a corresponding one of the input data items with reference to the data stored in the data memory 9 as required.

The processor 15 executes a predetermined process for the output data items from the processors 10–13. Based on the processing results, the processor 15 supplies to the DMA controller 17 an instruction indicating which output data item out of the output data items from the processors 10–13 and 15 should be transmitted to the output port. The DMA controller 17 transmits the output data from the processor to the output port in accordance with the instruction.

Figure 1:
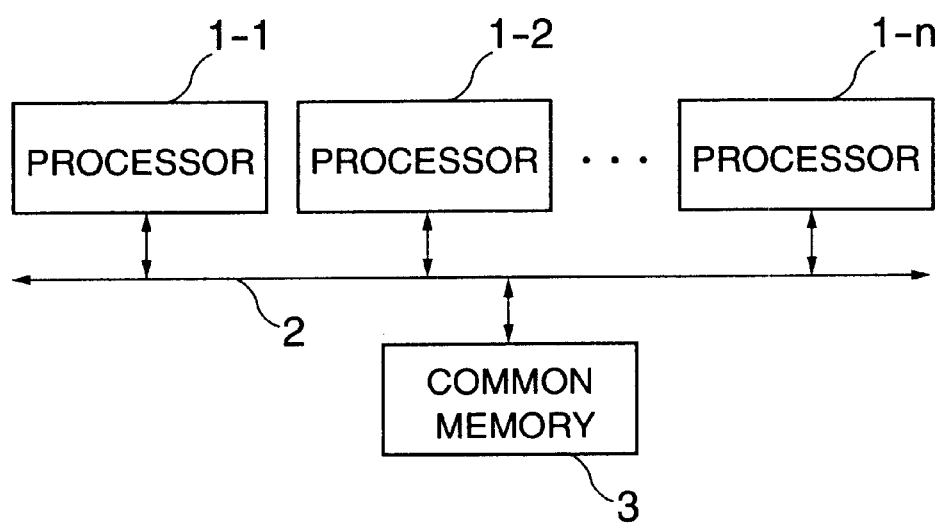
FIG. 1 is a block diagram illustrating an example of a conventional multi processor system.
Figure 2:
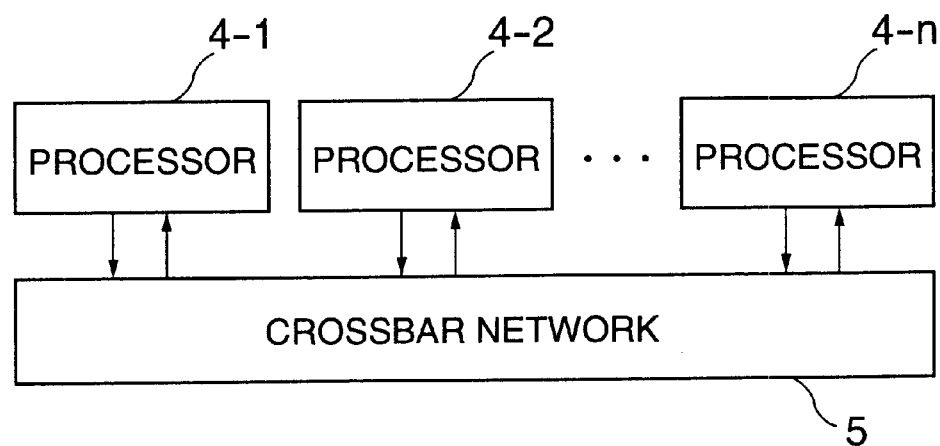
FIG. 2 is a block diagram illustrating another example of the conventional multi processor system.

In the multi processor system according to the first embodiment of the present invention, the instructions (the input data) can be processed in parallel by the processors 10–13. Since the processor 7 delivers the input data items to the respective processors 10–13, the bus shared by the processors as shown in FIG. 1 is not needed. In addition, the crossbar network used in the multi processor system as shown in FIG. 2 is also not needed.

As a result, the event in which a data delivery operation is awaited does not occur and a procedure for obtaining the bus right is not needed. Further, the event in which a data delivery operation is awaited due to the conflict of a plurality of data delivery operations on a crossbar switch does not occur.

Thus, according to the first embodiment of the present invention, the time required for the data delivery can be decreased and the circuitry structure can be simplified.

In the multi processor system according to the present invention, the DMA controller 17 is used to transmit output data items from the processors 10–13 and 15 to the output port. However, a processor may be substituted for the DAM controller 17.

A description will now be given of a second embodiment of the present invention.

Figure 4:
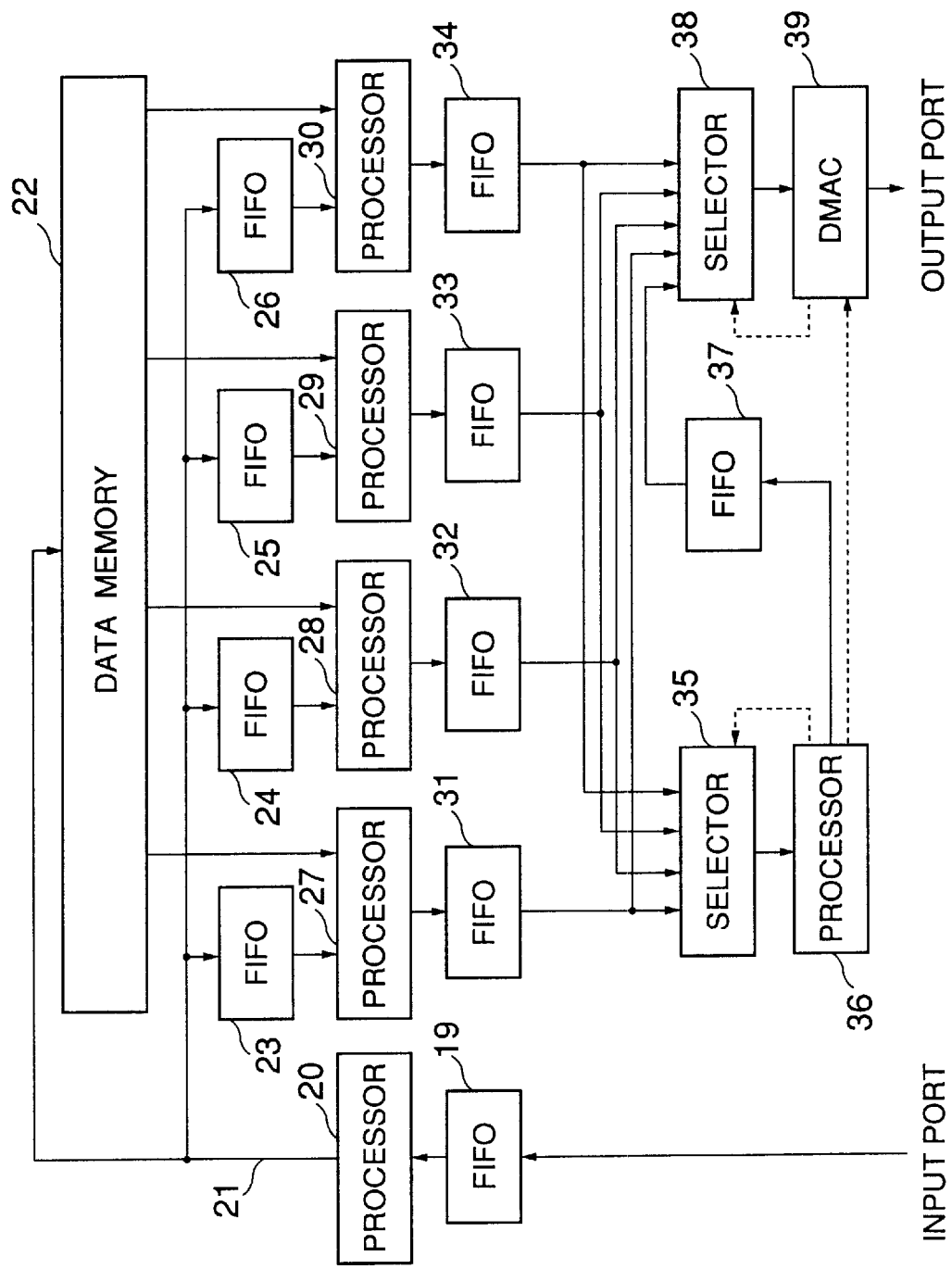
FIG. 4 is a block circuitry diagram illustrating the multi processor system according to a second embodiment of the present invention.

A multi processor system according to the second embodiment of the present invention is formed as shown in FIG. 4. Referring to FIG. 4, the multi processor system has FIFO circuits 19, 23–26, 31–34 and 37, processors 20, 27–30 and 36, a data memory 22, selectors 35 and 38 and a DMA controller 39.

The FIFO (First-In-First-Out) circuit 19 stores input data formed of packets successively input via the input port.

The processor 20 has data input terminals and data output terminals. The processor 20 is programmed so as to decode commands included in the input data stored in the FIFO circuit 19, determine a destination (in this embodiment, one of the data memory 22 and processors 27–30) and deliver input data to the destination.

The processor 20 uses a dedicated bus 21 to deliver the input data. The processor 20 is further programmed as follows. That is, when the input data is predetermined data (in this embodiment, data which should be accessed to process input data supplied from the processor 20 to the processors 27–30), the processor 20 delivers the input data to the data memory 22.

Each of the FIFO circuits 23–26 stores the input data which should be delivered from the processor 20 to one of the processors 27–30. The processors 27–30 have data output terminals and data input terminals connected to the dedicated bus. Each of the processors 27–30 is programmed so as to execute a predetermined process for input data stored in a corresponding one of the FIFO circuits 23–26 with reference to the data stored in the data memory 22 as required.

The FIFO circuits 31–34 store output data from the processors 27–30. The selector 35 is controlled by the processor 36 so as to select one of the output data items of the processors 27–30 stored in the FIFO 31–34.

The processor 36 has data input terminals and data output terminals and controls the selector 35. The processor 36 is further programmed so as to supply to the DMA controller 39 instructions indicating which output data out of those from the processors 27–30 and 36 should be transmitted to the output port.

The FIFO circuit 37 stores output data from the processor 36. The selector 38 selects, under control of the DMA controller 39, one of the output data items from the FIFO circuits 31–34 and 37. The DMA controller 39 controls the selector 38 and transmits the output data specified by the processor 36 to the output port.

Figure 5:
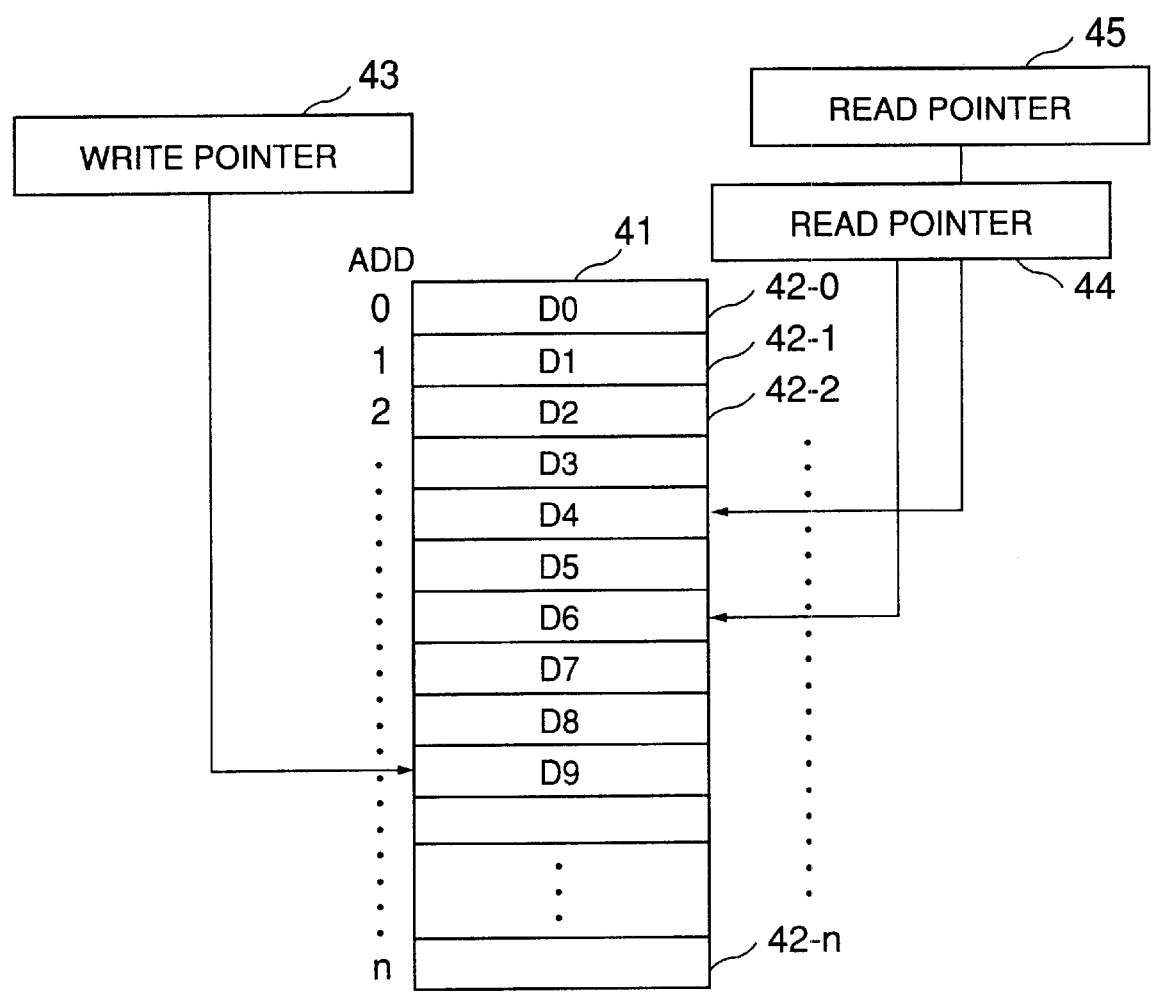
FIG. 5 is a block diagram illustrating a structure of each of FIFO circuits used in the multi processor system as shown in FIG. 4.

FIG. 5 conceptually shows the structure of the FIFO circuit 31. Each of the other FIFO circuits 32–34 and 37 has the same structure as the FIFO circuit 31.

Referring to FIG. 5, the FIFO circuit 31 has a memory portion 41, a write pointer 43 and read pointers 44 and 45. The memory portion 41 has data storage areas 42-0, 42-1, . . . , 42-n to which addresses (ADD: 0, 1, . . . , n) are assigned.

The write pointer 43 specifies an address assigned to a data storage area to be accessed to write data. Each of the read pointers 44 and 45 specifies an address assigned to a data storage area to be accessed to read data. The write pointer 43 is assigned to the processor 27, the read pointer 44 is assigned to the processor 36 and the read pointer 45 is assigned to the DMA controller 39.

That is, in the present embodiment, each of the FIFO circuits 31–34 has one write pointer and two read pointers. The write pointer 43 of each of the FIFO circuits 31–34 is assigned to a corresponding one of the processors 27–30. The read pointer 44 of each of the FIFO circuits 31–34 is assigned to the processor 36 which reads the output data from the FIFO circuits 31–34. The read pointer 45 of each of the FIFO circuits 31–34 is assigned to the DMA controller 39 which reads the output data from the FIFO circuits 31–34.

In the multi processor system, according to the second embodiment of the present invention, having the structure as described above, the input data items successively input via the input port are stored in the FIFO circuit 19. The processor 20 reads the input data items from the FIFO circuit 19 and decodes commands included in the input data items. The processor 20 then determines destinations based on the decoding result and delivers each of the input data items to one of the data memory 22 and FIFO circuits 23–26 (the destinations).

The processors 27–30 read the input data items from the FIFO circuits 23–26 and execute the predetermined processes for the input data items with reference to the data stored in the data memory 22 as required. The output data items from the processors 27–30 are stored in the FIFO circuits 31–34.

Further, the processor 36 executes a predetermined process for the output data items stored in the FIFO circuits 31–34 from the processors 27–30 and supplies to the DMA controller 39 instructions indicating which output data out of those from the processors 27–30 and 36 should be output to the output port. The DMA controller 39 delivers, in accordance with the instructions from the processor 36, one of the output data items stored in the FIFO circuits 31–34 and 37 from the processors 27–30 and 36 to the output port.

For example, in a case where the output data items from the processor 27 are written in the FIFO 31, the processor 27 causes the write pointer 43 to successively specify addresses 0, 1, . . . , n, so that the output data items from the processor 27 are successively written in the data storage areas 42-0, 42-1, . . . , 42-n of the FIFO circuit 31 identified by the addresses 0, 1, . . . , n.

After the output data items from the processor 27 are stored in the FIFO circuit 31, the processor 36 causes the read pointer 44 to successively specify addresses 0, 1, . . . , n so as to read the output data items from the data storage areas 42-0, 42-1, . . . , 42-n of the FIFO 31 identified by the addresses 0, 1, . . . , n.

For example, when an instruction that the output data items from the processor 27 should be output to the output port is supplied from the processor 36 to the DMA controller 39, the DMA controller 39 causes the read pointer 45 to successively specify addresses 0, 1, . . . , n so as to read the output data items from the data storage areas 42-0, 42-1, . . . , 42-n of the FIFO 31 identified by the addresses 0, 1, . . . , n and output them to the output port.

On the other hand, when an instruction that the output data items from the processor 36 should be output to the output port is supplied from the processor 36 to the DMA controller 39, the DMA controller 39 causes the read pointer 45 of the FIFO 37 to successively specify addresses 0, 1, . . . , n so as to read the output data items from the address storage areas of the FIFO 37 identified by the addresses 0, 1, . . . , n and output them to the output port.

As has been described above, the data items stored in the FIFO circuit 31 can be reused without spoiling a function, of the FIFO, that data items input thereto are output in the inputting order.

FIG. 6 shows programs used in the multi processor system according to the second embodiment of the present invention. Referring to FIG. 6, "SYNCff" is an instruction for stopping execution of subsequent instructions when the FIFO circuit for the destination is filled with data items. "SYNCfe" is an instruction for stopping execution of subsequent instructions when the FIFO circuit from which data items are received is empty. "FIFOup" is an instruction for incrementing (performing a count-up operation of) a FIFO counter of the FIFO circuit. "FIFOdn" is an instruction for decrement (a count-down operation) of the FIFO counter of the FIFO circuit.

In addition, "mov r0, ofifo . . . " is an instruction for supplying data items in registers r0, . . . of the processor 20 to the FIFO circuit of the destination. "add ififo, r15 . . . " is an instruction for adding data items in the FIFO 23 to registers r15, . . . of the processor 27.

Thus, in the present embodiment, the processor 20 is programmed as follows.

When the FIFO circuit for the destination is filled with the data items, the processor 20 stops execution of the subsequent instructions. On the other hand, when the FIFO circuit for the destination is not filled with the data items, the processor 20 delivers the contents of the registers r0, r1, r2 . . . to the FIFO circuit for the destination. When the delivery of the data items is completed, the FIFO counter provided in the FIFO circuit for the destination is incremented (the count-up operation is performed).

The processor 27 is programmed as follows.

When the FIFO circuit 23 from which the data items are received is empty, the processor 27 stops execution of the subsequent instructions. On the other hand, when the FIFO circuit 23 from which the data items are received is not empty, the contents of the FIFO 23 are added to the registers r15, r14, r13 . . . . When such an adding operation is completed, the FIFO counter provided in the FIFO circuit 23 is decremented (the count-down operation is performed).

FIG. 7 shows operations, based on the programs shown in FIG. 6, of the multi processor system according to the second embodiment of the invention.

Referring to FIG. 7, the processor 20 waits for release from a state where the FIFO 23 is filled with data items. When the processor 27 executes an instruction for the count-down operation of the FIFO counter of the FIFO 23, the processor 20 is released from the waiting state for the data transmission, so that the contents of the registers r0, r1, r2, . . . are transmitted to the FIFO 23. The processor 27 then waits for the FIFO 23 to be released from an empty state.

When the processor 20 executes an instruction for the count-up operation of the FIFO 23, the processor 27 is released from the waiting state and executes an instruction for adding the contents of the FIFO 23 to the registers r15, r14, r13, . . . .

In the second embodiment of the present invention, instructions can be executed by the processors 27–30 in parallel. Further, since the input data items are delivered from the processor 20 to the respective processors 27–30 via the dedicated bus 21, the bus 2, needed in the conventional multi processor system as shown in FIG. 1, shared by a plurality of processors is not needed. In addition, the crossbar network 5, needed in the conventional multi processor system as shown in FIG. 2, is not needed.

As a result, there is no event for waiting for the data transmission as occurred in the conventional multi processor system as shown in FIG. 1. The procedure for obtaining the bus right is not needed. Further, there is no problem that a plurality of processors conflict with each other on a crossbar switch so that delivery of data is awaited as in the conventional multi processor system shown in FIG. 2.

Thus, according to the second embodiment of the present invention, the time required for the data delivery can be decreased so that the data can be processed at a high speed. In addition, the circuitry structure can be simplified.

In addition, due to the instructions "SSYNCff", "SYNCfe", "FIFOup" and "FIFOdn", the synchronization in the data transmission can be easily established. A branch instruction may be executed based on conditions FIFO-full and FIFO-empty.

A processor may be substituted for the DMA controller 39 which transmits the output data from the processors 27–30 and 36 to the output port.

FIFO circuits are used for the multi processor system as has been described above. Each of the FIFO circuits has an essential function of outputting data items in an input order of the data items. Further, the FIFO circuit has an advantage that data items stored therein can be reused.

A description will now be given, with reference to the drawings, of FIFO circuits according to embodiments of the present invention.

Figure 8:
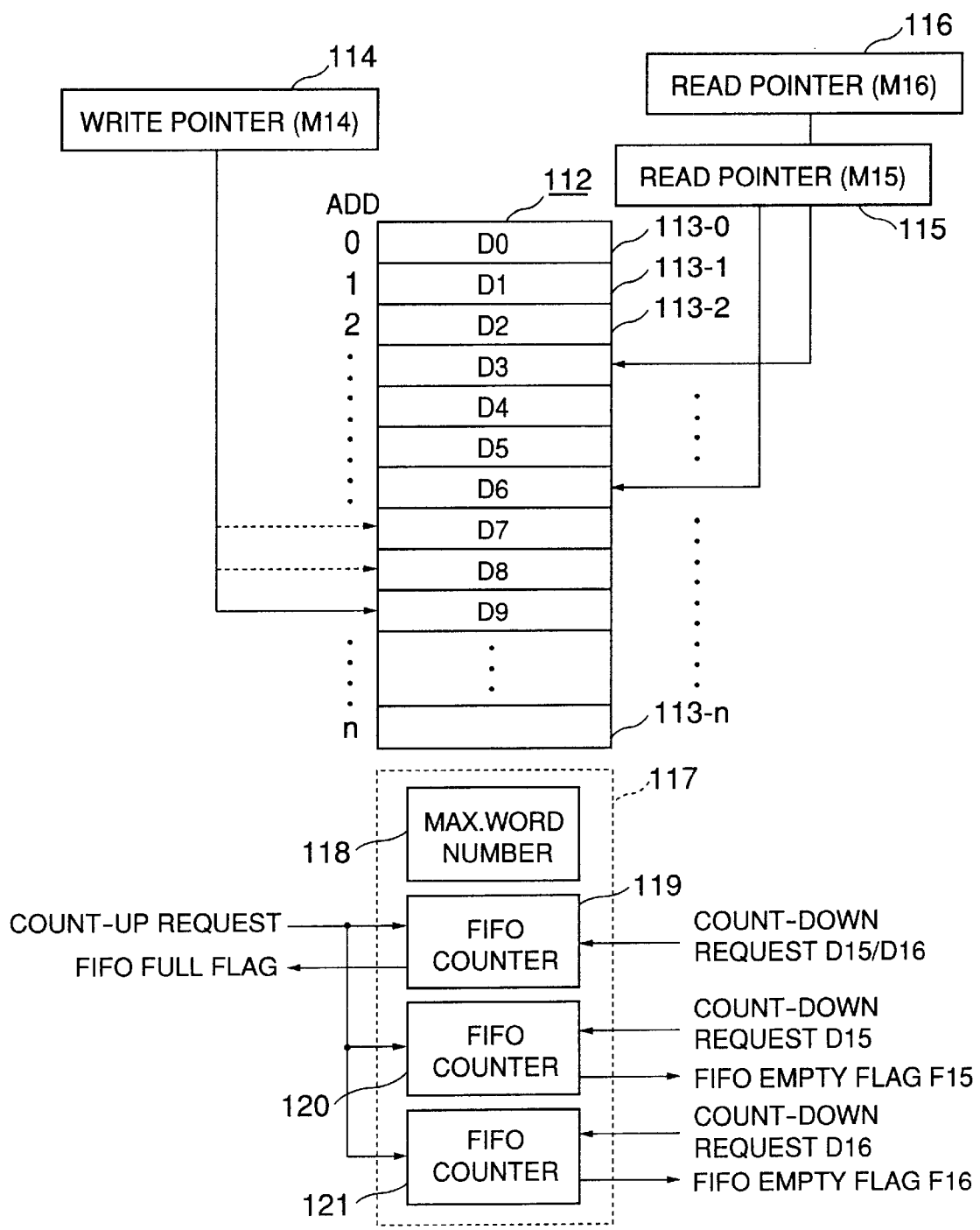
FIG. 8 is a block diagram illustrating a FIFO circuit, according to a first embodiment of the present invention, applicable to the multi processor system.

The FIFO circuit according to a first embodiment is conceptually shown in FIG. 8. In the FIFO shown in FIG. 8, the FIFO counter is updated word by word. Referring to FIG. 8, the FIFO circuit has a memory portion 112 provided with one write port and two read ports. A write pointer 114 and two read pointers 115 and 116 are used to access the memory portion 112 of the FIFO circuit. The memory portion 112 includes word storage areas 113-0, 113-1, . . . , 113-n which are respectively identified by addresses 0, 1, . . . , n.

The write pointer 114 specifies write addresses. Each of the read pointers 115 and 116 specifies read addresses. The write pointer 114 is assigned to a master M14 (not shown) which can access the memory portion 112 for a write operation. The read pointers 115 and 116 are respectively assigned to masters M15 and M16 (not shown) which can access the memory portion 112 for read operations.

A FIFO-full/empty flag generating unit 117 is provided for the FIFO circuit. The FIFO-full/empty flag generating unit 117 has a maximum number setting register 118 and FIFO counters 119, 120 and 121. The FIFO-full/empty flag generating unit 117 outputs a FIFO-full flag to the master M14 to which the write pointer 114 is assigned when the memory portion 112 is filled with data items (a full state). The FIFO-full/empty flag generating unit 117 outputs a FIFO-empty flag to the master M15 to which the read pointer 115 is assigned when the memory portion 112, in which the read address is specified by the read pointer 115, is in the empty state for the master M15. The FIFO-full/empty flag generating unit 117 outputs the FIFO-empty flag to the master M16 to which the read pointer 116 is assigned when the memory portion, in which the read address is specified by the read pointer 116, is in the empty state for the master M16.

The maximum number of words which can be stored in the memory portion 112 is set in the maximum number setting register 118. The FIFO counter 119 is initially set at zero. Every time a count-up request is received from the master M14 to which the write pointer 114 is assigned, the FIFO counter 119 is incremented (a count-up operation is performed). Every time a count-down request is received from one of the masters M15 and M16, which one accesses the same addresses last, the FIFO counter 119 is decremented (a count-down operation is performed). When the count value of the FIFO counter 119 reaches the maximum value, that is, when the memory portion 112 is filled with data items (in the full state), the FIFO counter 119 outputs the FIFO-full flag to the master M14 to which the write pointer 114 is assigned.

The FIFO counter 120 is initially set at zero. Every time the count-up request is received from the master M14 to which the write pointer 114 is assigned, the FIFO counter 120 is incremented (the count-up operation is performed). Every time the count-down request D15 is received from the master M15 to which the read pointer 115 is assigned, the FIFO counter 120 is decremented (the count-down operation is performed). When the count value of the FIFO counter 120 becomes zero, that is, when the memory portion 112 becomes the empty state for the master M15, the FIFO counter 120 outputs the FIFO-empty flag F15 to the master M15 to which the read pointer 115 is assigned.

The FIFO counter 121 is initially set at zero. Every time the count-up request is received from the master M14, the FIFO counter 121 is incremented (the count-up operation is performed). Every time the count-down request is preformed from the master M16 to which the read pointer 116 is assigned, the FIFO counter 121 is decremented (the count-down operation is performed). When the count value of the FIFO counter 121 becomes zero, that is, when the memory portion 120 becomes the empty state for the master M16, the FIFO counter 121 outputs the FIFO empty flag F16 to the master M16 to which the read pointer 116 is assigned.

The write and read operations of the memory portion 112 of the FIFO circuit may be controlled so that an address specified by the master M14 using the write pointer 114 does not exceed an address specified by one of the masters M15 and M16, which one accesses the same addresses last, using the read pointer 115 or 116. In this case, the masters M15 and M16 to which the read pointers 115 and 116 are respectively assigned can use the same data items in the FIFO circuit.

Thus, according to the FIFO circuit according to the first embodiment, the data items stored in the FIFO circuit word by word can be reused without spoiling a function, of the FIFO, that data items input to the memory portion 112 are output in the inputting order.

A description will now be given of the FIFO circuit according to a second-embodiment.

Figure 9:
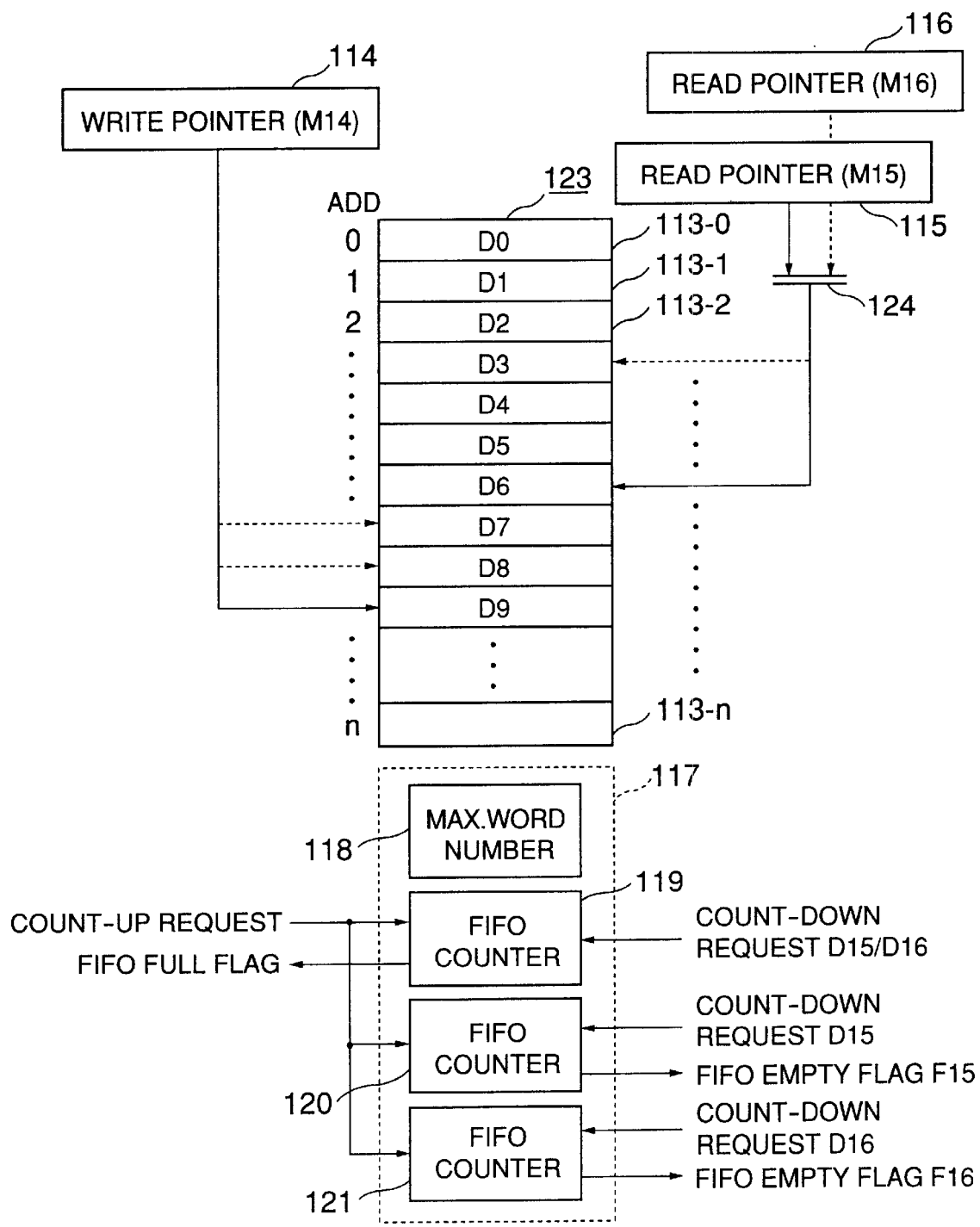
FIG. 9 is a block diagram illustrating the FIFO circuit according to a second embodiment of the present invention.

The FIFO circuit according to the second embodiment is conceptually shown in FIG. 9. Referring to FIG. 9, the FIFO circuit has a memory portion 123 provided with one write port and one read port substituted for the memory portion 112, provided with the one write port and two read ports, of the FIFO circuit according to the first embodiment shown in FIG. 8. The write pointer 114 and the read pointers 115 and 116 are provided. An arbiter 124 is provided between the read pointers 115 and 116 and the memory portion 123. The arbiter 124 arbitrates read access requests from the master M15 to which the read pointer 115 is assigned and read access requests from the master M16 to which the read pointer 116 is assigned. Other parts of the structure are the same as those of the FIFO circuit according to the first embodiment shown in FIG. 8.

In the FIFO circuit according to the second embodiment shown in FIG. 9, the number of read ports of the memory portion 123 is less than the number of read pointers. However, since the arbiter 124 is provided, the write and read operations of the memory portion 123 may be controlled so that an address specified by the master M14 using the write pointer does not exceed an address specified by one of the masters M15 and M16, which one accesses the same addresses last, using the read pointer 115 or 116. In this case, the master M15 and M16 to which the read pointers 115 and 116 are respectively assigned can use the same data items in the FIFO circuit.

Thus, according to the FIFO circuit according to the second embodiment, the data items stored in the memory portion 123 word by word can be reused without spoiling a function, of the FIFO, that data items input to the memory portion 123 are output in the inputting order.

In the first and second embodiments, the FIFO counters 119, 120 and 121 are initially set at zero. However, the FIFO counters 119, 120 and 121 may be initially set at a value equal to the maximum number of words set in the maximum number setting register 118.

In this case, every time a count-down request is received from the master M14 to which the write pointer 114 is assigned, the FIFO counter 119 is decremented (the count-down operation is performed). Every time a count-up request is received from one of the masters M15 and M16, which one accesses the same addresses last, the FIFO counter 119 is incremented (the count-up operation is performed). When the count value of the FIFO counter 119 becomes zero, that is, when the memory portion 112 or 123 is filled with data items (in the full state) for the master M14, the FIFO counter 119 outputs the FIFO-full flag to the master M14 to which the write pointer 114 is assigned.

In addition, every time a count-down request is received from the master M14 to which the write pointer 114 is assigned, the FIFO counter 120 is decremented (the count-down operation is performed). Every time a count-up request is requested from the master M15 to which the read pointer 115 is assigned, the FIFO counter 120 is incremented (the count-up operation is performed). When the count value of the FIFO counter 120 reaches the maximum number of words, that is, when the memory portion 112 or 123 becomes the empty state for the master M15, the FIFO counter 120 outputs the FIFO-empty flag F15 to the master M15.

Further, every time a count-down request is received from the master M14 to which the write pointer 114 is assigned, the FIFO counter 121 is decremented (the count-down operation is performed). Every time a count-up request is received from the master M16 to which the read pointer 116 is assigned, the FIFO counter 120 is incremented (the count-up operation is performed). When the count value of the FIFO counter 121 reaches the maximum number of words, that is, when the memory portion 112 or 123 becomes the empty state for the master M16, the FIFO counter 120 outputs the FIFO-empty flag F16 to the master M16.

A description will now be given of the FIFO circuit according to a third embodiment of the present invention.

Figure 10:
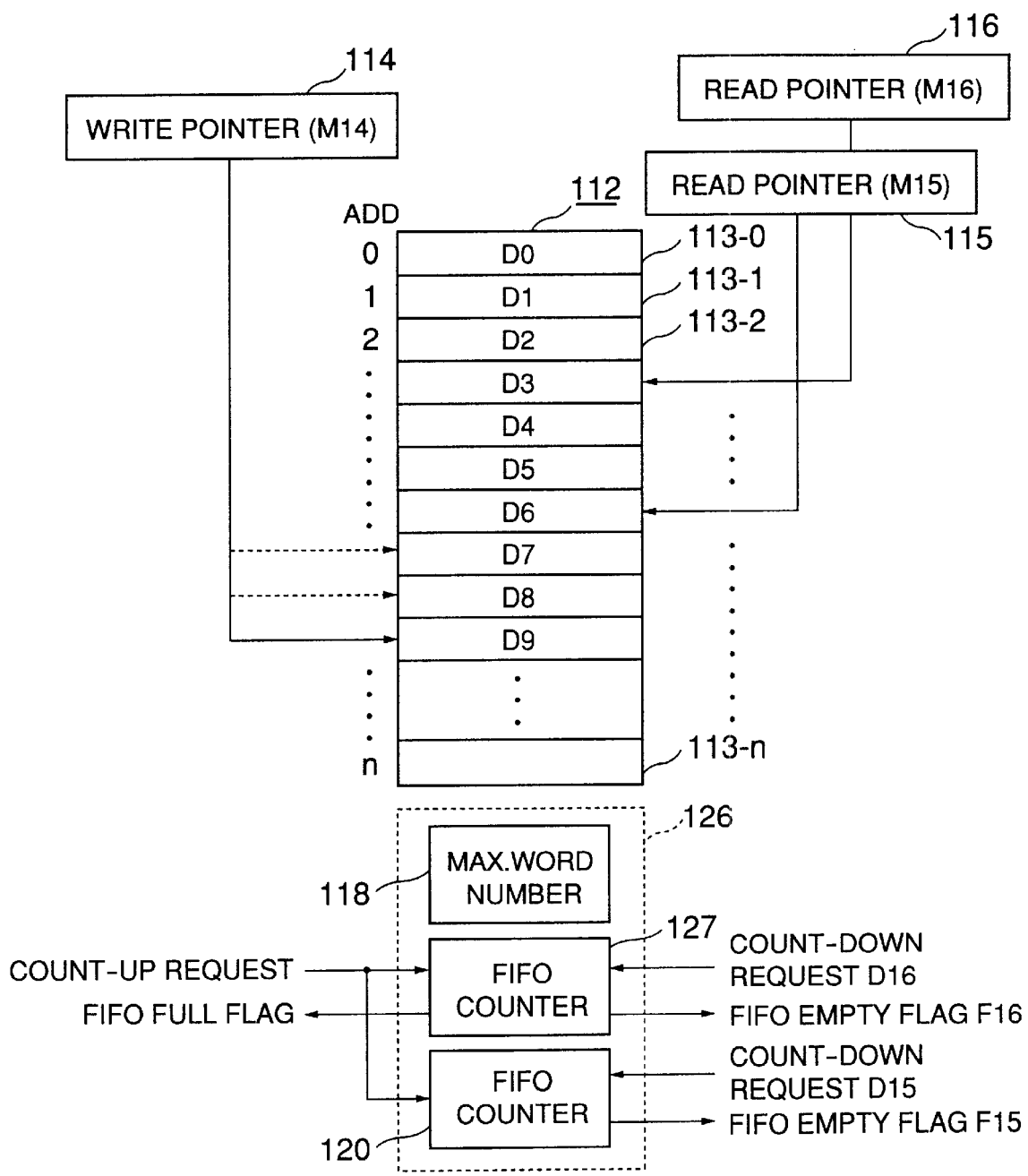
FIG. 10 is a block diagram illustrating the FIFO circuit according to a third embodiment of the present invention.

The FIFO circuit according to the third embodiment is conceptually shown in FIG. 10. The FIFO circuit according to the third embodiment is operated under a condition in which a read address specified by the master M15 using the read pointer 115 always precedes a read address specified by the master M16 using the read pointer 116. The FIFO circuit has a FIFO-full/empty flag generating unit 126. The structure of the FIFO-full/empty flag generating unit 126 differs from that of the FIFO-full/empty flag generating unit 117 in the first embodiment shown in FIG. 8. Other parts of the FIFO circuit according to the third embodiment are the same as those of the FIFO circuit according to the first embodiment shown in FIG. 8.

The FIFO-full/empty flag generating unit 126 has a FIFO counter 127 substituted for the FIFO counter 119 provided in the FIFO-full/empty flag generating unit 117 shown in FIG. 8. A FIFO counter corresponding to the FIFO counter 121 of the FIFO-full/empty flag generating unit 117 is not provided in the FIFO-full/empty flag generating unit 126. Other parts of the FIFO-full/empty flag generating unit 126 are the same as those of the FIFO-full/empty flag generating unit 117.

The FIFO counter 127 is initially set at zero. Every time a count-up request is received from the master M14 to which the write pointer 114 is assigned, the FIFO counter 127 is incremented (the count-up operation is preformed). Every time a count-down request D16 is received from the master M16 to which the read pointer 116 is assigned, the FIFO counter 127 is decremented (the count-down operation is performed). When the count value of the FIFO counter 127 reaches the maximum number of words, that is, when the memory portion 112 is filled with data items for the master M14 (in the full state), the FIFO counter 127 outputs the full flag to the master M14 to which the write pointer 114 is assigned. On the other hand, when the count value of the FIFO counter 127 is zero, that is, when the memory portion 112 is in the empty state for the master M16, the FIFO counter 127 outputs the empty flag to the master M16 to which the read pointer 116 is assigned.

In the FIFO circuit according to the third embodiment formed as described above, the read and write operations may be controlled so that an address specified by the master M14 using the write pointer 114 does not exceed an address specified by the master M16 using the read pointer 116 under the condition in which a read address specified by the master M15 always precedes a read address specified by the master M16. In this case, the masters M15 and M16 to which the read pointers 115 and 116 are respectively assigned can use the same data items in the FIFO circuit.

According to the FIFO circuit according to the third embodiment of the present invention, data stored in the FIFO circuit word by word can be reused without spoiling a function, of the FIFO, that data items input to the memory portion 112 are output in the inputting order.

A description will now be given of the FIFO circuit according to a fourth embodiment of the present invention.

Figure 11:
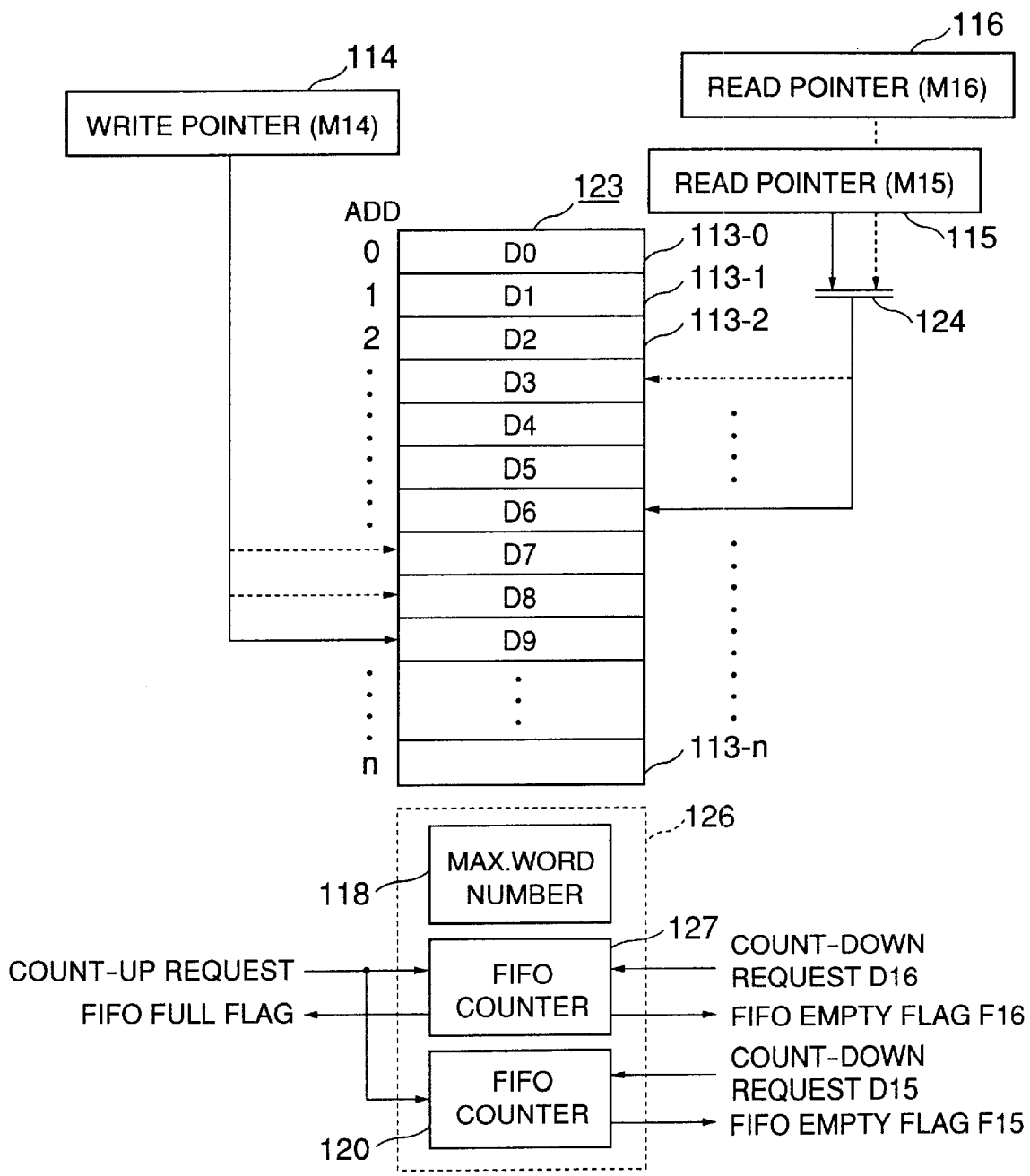
FIG. 11 is a block diagram illustrating the FIFO circuit according to a fourth embodiment of the present invention.

The FIFO circuit according to the fourth embodiment is conceptually shown in FIG. 11. Referring to FIG. 11, the FIFO circuit has the memory portion 123, provided with the one write port and one read port, substituted for the memory portion 112, provided with the one write port and two read ports, of the FIFO circuit according to the third embodiment shown in FIG. 10. The write pointer 114 and the read pointers 115 and 116 are provided. The arbiter 124 is provided between the read pointers 115 and 116 and the memory portion 123. The arbiter 124 arbitrates read access requests from the master M15 to which the read pointer 115 is assigned and read access requests from the master M16 to which the read pointer 116 is assigned. Other parts of the structure are the same as those of the FIFO circuit according to the third embodiment shown in FIG. 10.

In the FIFO circuit according to the fourth embodiment shown in FIG. 11, the number of read ports of the memory 123 is less than the number of read pointers. However, since the arbiter 124 is provided, the write and read operations of the memory portion 123 may be controlled so that an address specified by the master M14 using the write pointer 114 does not exceed an address specified by the master M16 using the read pointer 116 under the condition in which a read address specified by the master M15 always precedes a read address specified by the master M16. In this case, the masters M15 and M16 to which the read pointers 115 and 116 are respectively assigned can use the same data items in the FIFO circuit.

According to the FIFO circuit according to the fourth embodiment of the present invention, data items stored in the memory portion 123 can be reused word by word without spoiling a function, of the FIFO, that data items input to the memory portion 123 are output in the inputting order.

In the FIFO circuits according to the third and fourth embodiments, the FIFO counters 127 and 120 are initially set at zero. However, the FIFO counters 127 and 120 may be initially set at a value equal to the maximum number of words set in the maximum number setting register 118.

In this case, every time a count-down request is received from the master M14 to which the write pointer 114 is assigned, the FIFO counter 127 is decremented (the count-down operation is performed). Every time a count-up request is received from the master M16 to which the read pointer 116 is assigned, the FIFO counter 127 is incremented (the count-up operation is performed). When the count value of the FIFO counter 127 becomes zero, that is, when the memory portion 112 or 123 is filled with data items (in the full state) for the master M14, the FIFO counter 127 outputs the full flag to the master M14. On the other hand, when the count value of the FIFO counter 127 reaches a value equal to the maximum number of words, that is, when the memory portion 112 or 123 becomes the empty state for the master M16 to which the read pointer 116 is assigned, the FIFO counter 127 outputs the empty flag F16 to the master M16.

In addition, every time a count-down request is received from the master M14 to which the write pointer 114 is assigned, the FIFO counter 120 is decremented (the count-down operation is performed). Every time a count-up request is received from the master M15 to which the read pointer 115 is assigned, the FIFO counter 120 is incremented (the count-up operation is performed). When the count value of the FIFO counter 120 reaches the maximum number of words, that is, when the memory portion 112 or 123 becomes the empty state for the master M15, the FIFO counter 120 outputs the FIFO-empty flag F15 to the master M15.

A description will now be given of the FIFO circuit according to a fifth embodiment of the present invention. The FIFO circuit according to the fifth embodiment of the present invention is conceptually shown in FIG. 12. In the FIFO circuit according to the fifth embodiment, FIFO counters are updated packet by packet.

Figure 12:
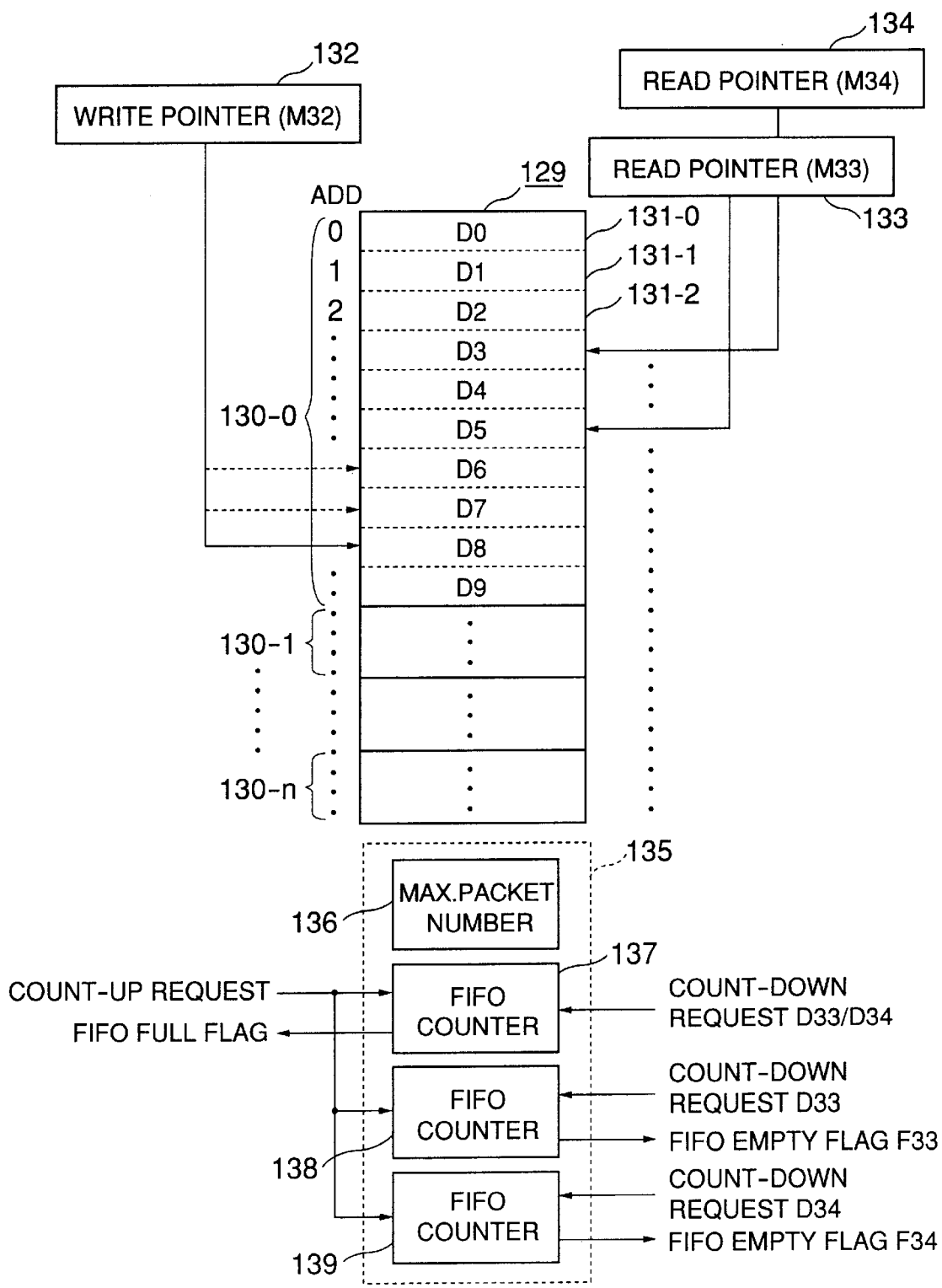
FIG. 12 is a block diagram illustrating the FIFO circuit according to a fifth embodiment of the present invention.

Referring to FIG. 12, the FIFO circuit has a memory portion 129, a write pointer 132 and read pointers 133 and 134. The memory portion 129 has packet storage areas 130-0, 130-1, . . . , 130-n which include word storage areas 131-0, 131-1, . . . identified by addresses 0, 1, . . . .

The write pointer 132 specifies a write address and is assigned to a master M32 (not shown) which can write-access the memory portion 129. The read pointers 133 and 134 specify read addresses and are respectively assigned to masters M33 and M34 (not shown) which can read-access the memory portion 129.

The FIFO circuit further has a FIFO-full/empty flag generating unit 135. When the memory portion 129 is filled with data items (in the full state), the FIFO-full/empty flag generating unit 135 outputs a full flag to the master M32 to which the write pointer 132 is assigned. When the memory portion 129 is in an empty state for the master M33 to which the read pointer 133 is assigned, the FIFO-full/empty flag generating unit 135 outputs an empty flag to the master M33. When the memory portion 129 is in the empty state for the master M34 to which the read pointer 134 is assigned, the FIFO-full/empty flag generating unit 135 outputs the empty flag to the master M34. The FIFO-full/empty flag generating unit 135 has a maximum number setting register 136 and FIFO counters 137, 138 and 139.

The maximum number of packets which can be stored in the memory portion 129 is set in the maximum number setting register 136. The FIFO counter 137 is initially set at zero. Every time a count-up request is received from the master M32 to which the write pointer 132 is assigned, the FIFO counter 137 is incremented (the count-up operation is performed). Every time a count-down request D33 or D34 is received from one of the masters M33 and M34, which one accesses the same addresses last, the FIFO counter 137 is decremented (the count-down operation is performed). When the count value of the FIFO counter 137 reaches a value equal to the maximum number of packets, that is when the memory portion 129 is filled with data items (in the full state) for the master M32 to which the write pointer 132 is assigned, the FIFO counter 137 outputs the full flag to the master M32.

The FIFO counter 138 is initially set at zero. Every time a count-up request is received from the master M32, the FIFO counter 138 is incremented (the count-up operation is performed). Every time a count-down request D33 is received from the master M33, the FIFO counter 138 is decremented (the count-down operation is performed). When the count value of the FIFO counter 138 becomes zero, that is, when the memory portion 129 becomes the empty state for the master M33 to which the read pointer 133 is assigned, the FIFO counter 138 outputs the empty flag F33 to the master M33.

The FIFO counter 139 is initially set at zero. Every time a count-up request is received from the master M32, the FIFO counter 139 is incremented (the count-up operation is performed). Every time a count-down request D34 is received from the master M34, the FIFO counter 139 is decremented (the count-down operation is performed). When the count value of the FIFO counter 139 becomes zero, that is, when the memory portion 129 becomes the empty state for the master M34 to which the read pointer 134 is assigned, the FIFO counter 139 outputs the empty flag F34 to the master M34.

In the FIFO circuit, having the structure as described above, according to the fifth embodiment of the present invention, the write and read operations of the FIFO circuit may be controlled so that an address specified by the master M32 using the write pointer 132 does not exceed an address specified by one of the masters M33 and M34, which one accesses the same read addresses last using a corresponding one of the read pointers 133 and 134. In this case, the masters M33 and M34 to which the read pointers 133 and 134 are respectively assigned can use the same data items in the FIFO circuit.

Thus, according to the FIFO circuit according to the fifth embodiment of the present invention, data stored in the FIFO circuit can be reused packet by packet without spoiling a function, of the FIFO, that data items input to the FIFO circuit are output in the inputting order. The read accesses to word storage areas in each packet storage area may be performed at random.

Figure 13:
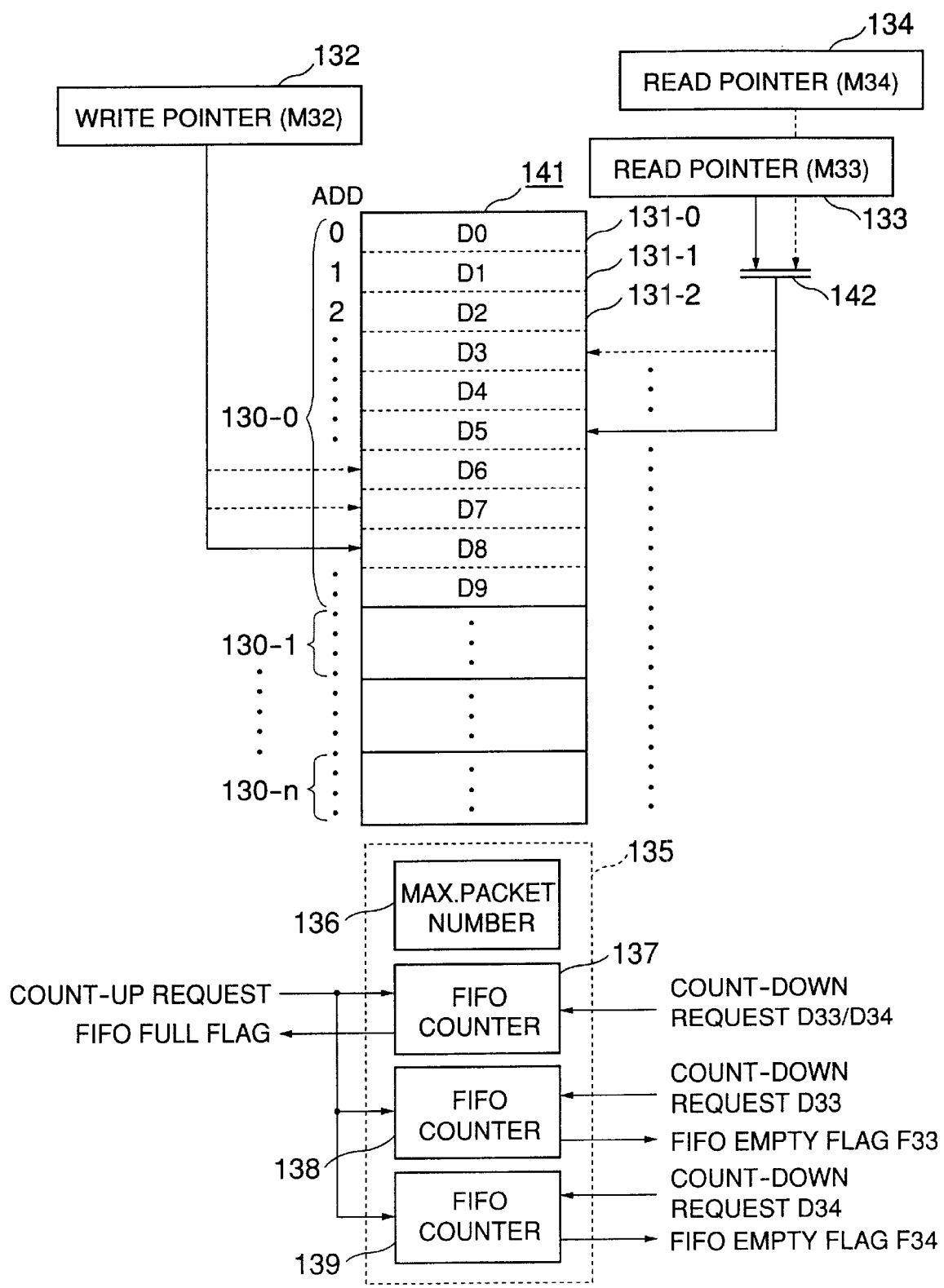
FIG. 13 is a block diagram illustrating the FIFO circuit according to a sixth embodiment of the present invention.

A description will now be given of the FIFO circuit according to a sixth embodiment of the present invention. The FIFO circuit according to the sixth embodiment is conceptually shown in FIG. 13. Referring to FIG. 13, the FIFO circuit has a memory portion 141 provided with one write port and one read port substituted for the memory 129, provided with the one write port and two read ports, of the FIFO circuit according to the fifth embodiment shown in FIG. 12. The write pointer 132 and read pointers 133 and 134 are provided. An arbiter 142 is provided between the read pointers 133 and 134 and the memory portion 141. The arbiter 142 arbitrates read access requests from the master M33 to which the read pointer 133 is assigned and read access requests from the master M34 to which the read pointer 134 is assigned. Other parts of the structure are the same as those of the FIFO circuit according to the fifth embodiment shown in FIG. 12.

In the FIFO circuit according to the sixth embodiment shown in FIG. 13, the number of read ports of the memory portion 141 is less than the number of read pointers. However, since the arbiter 142 is provided, the write and read operations of the memory portion 141 may be controlled so that an address specified by the master M32 using the write pointer 132 does not exceed an address specified by one of the masters M33 and M34, which one accesses last the same addresses, using the read pointer 133 or 134. In this case, the masters M33 and M34 to which the read pointers 133 and 134 are respectively assigned can use the same data items in the FIFO circuit.

Thus, according to the FIFO circuit according to the sixth embodiment, the data items stored in the memory portion 141 packet by packet can be reused without spoiling a function, of the FIFO, that data items input to the memory portion 141 are output in the inputting order. Read accesses to word storage areas may be executed at random.

In the fifth and sixth embodiments, the FIFO counters 137, 138 and 139 are initially set at zero. However, the FIFO counters 137, 138 and 139 may be initially set at value equal to the maximum number of packets set in the maximum number setting register 136.

In this case, every time a count-down request is received from the master M32 to which the write pointer 132 is assigned, the FIFO counter 137 is decremented (the count-down operation is performed). Every time a count-up request is received from one of the masters M33 and M34, which one accesses the same addresses last, the FIFO counter 137 is incremented (the count-up operation is performed). When the count value of the FIFO counter 137 becomes zero, that is, when the memory portion 129 or 141 is filled with the data items (in the full state) for the master M32 to which the write pointer 132 is assigned, the FIFO counter 137 outputs the full flag to the master M32.

In addition, every time a count-down request is received from the master M32 to which the write pointer 132 is assigned, the FIFO counter 138 is decremented (the count-down operation is performed). Every time a count-up request is received from the master M33 to which the read pointer 133 is assigned, the FIFO counter 138 is incremented (the count-up operation is performed). When the count value of the FIFO counter 138 reaches a value equal to the maximum number of packets, that is, when the memory portion 129 or 141 becomes the empty state for the master M33 to which the read pointer 133 is assigned, the FIFO counter 138 outputs the empty flag F33 to the master M33.

Further, every time a count-down request is received from the master M32 to which the write pointer 132 is assigned, the FIFO counter 139 is decremented (the count-down operation is performed). Every time a count-up request is received from the master M34 to which the read pointer 134 is assigned, the FIFO counter 139 is incremented (the count-up operation is performed). When the count value of the FIFO counter 139 reaches a value equal to the maximum number of packets, that is, when the memory portion 129 or 141 becomes the empty state for the master M34, the FIFO counter 139 outputs the empty flag F34 to the master M34.

Figure 14:
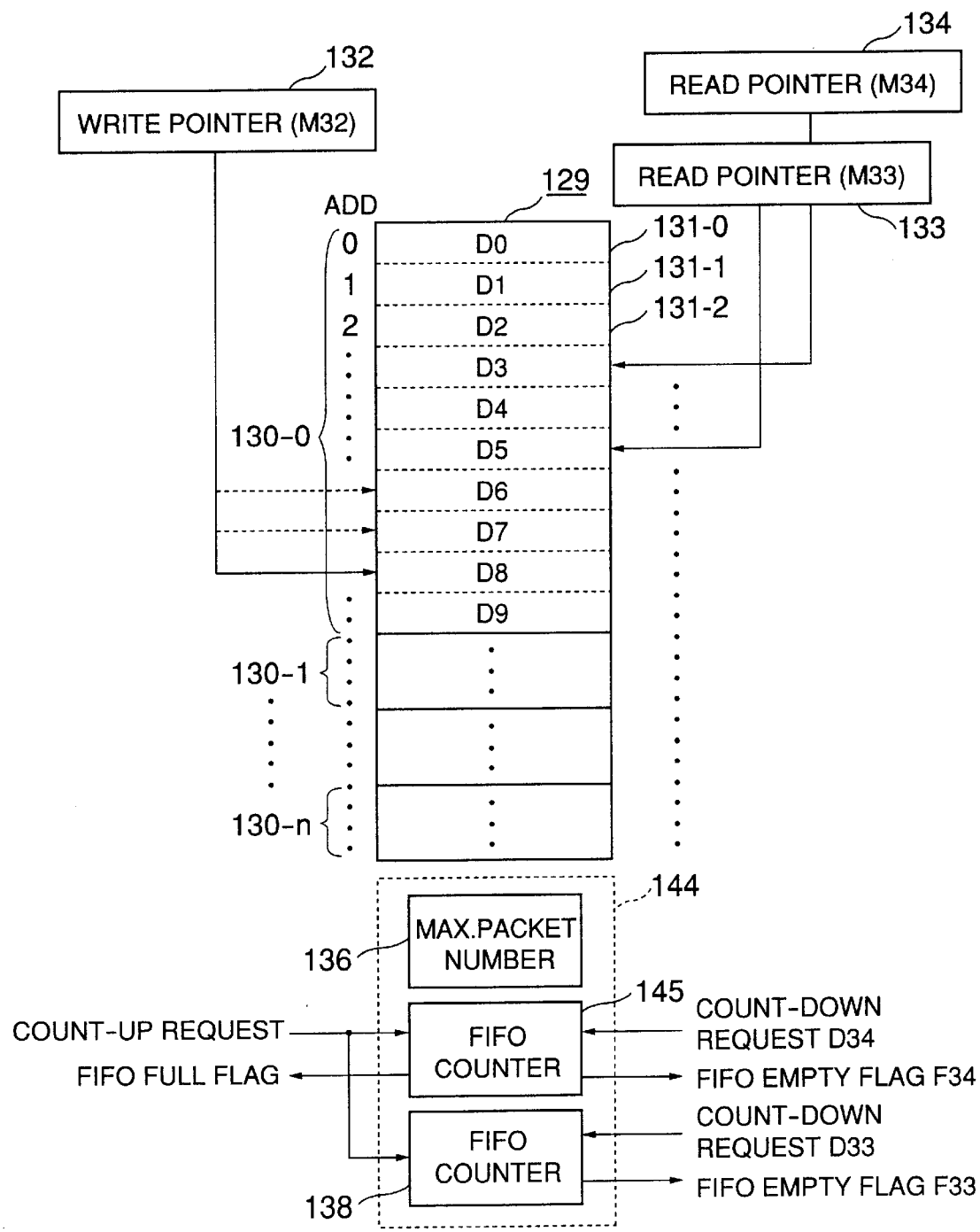
FIG. 14 is a block diagram illustrating the FIFO circuit according to a seventh embodiment of the present invention.

A description will now be given of the FIFO circuit according to a seventh embodiment of the present invention. The FIFO circuit according to the seventh embodiment is conceptually shown in FIG. 14. The FIFO circuit according to the seventh embodiment is operated under a condition in which a read address specified by the master M33 using the read pointer 133 always precedes a read address specified by the master M34 using the read pointer 134. The FIFO circuit has a FIFO-full/empty flag generating unit 144. The structure of the FIFO-full/empty flag generating unit 144 differs from that of the FIFO-full/empty flag generating unit 135 in the fifth embodiment shown in FIG. 12. Other parts of the FIFO circuit according to the seventh embodiment are the same as those of the FIFO circuit according to the fifth embodiment shown in FIG. 12.

The FIFO-full/empty flag generating unit 144 has a FIFO counter 145 substituted for the FIFO counter 137 provided in the FIFO-full/empty flag generating unit 135 shown in FIG. 12. A FIFO counter corresponding to the FIFO counter 139 of the FIFO-full/empty flag generating unit 135 is not provided in the FIFO-full/empty flag generating unit 144. Other parts of the FIFO-full/empty flag generating unit 144 are the same as those of the FIFO-full/empty flag generating unit 135.

The FIFO counter 145 is initially set at zero. Every time a count-up request is received from the master M32 to which the write pointer 132 is assigned, the FIFO counter 145 is incremented (the count-up operation is performed). Every time a count-down request D34 is received from the master M34 to which the read pointer 134 is assigned, the FIFO counter 145 is decremented (the count-down operation is performed). When the count value of the FIFO counter 145 reaches a value equal to the maximum number of packets, that is, when the memory portion 129 is filled with data items (in the full state) for the master M32 to which the write pointer is assigned, the FIFO counter 145 outputs the full flag to the master M32. On the other hand, when the count value of the FIFO counter 145 becomes zero, that is, when the memory portion 129 becomes the empty state for the master M34 to which the read pointer 134 is assigned, the FIFO counter 145 outputs the empty flag F34 to the master M34.

In the FIFO circuit according to the seventh embodiment formed as described above, the read and write operations may be controlled so that an address specified by the master M32 using the write pointer 132 does not exceed an address specified by the master M34 under the condition in which a read address specified by the master M33 always precedes a read address specified by the master M34. In this case, the masters M33 and M34 to which the read pointers 133 and 134 are respectively assigned can use the same data items in the FIFO circuit.

Thus, according to the FIFO circuit according to the seventh embodiment of the present invention, data items stored in the FIFO circuit packet by packet can be reused without spoiling a function, of the FIFO, that data items input to the memory portion 129 are output in the input order. The read accesses to the word storage areas in each of the packet storage areas can be executed at random.

Figure 15:
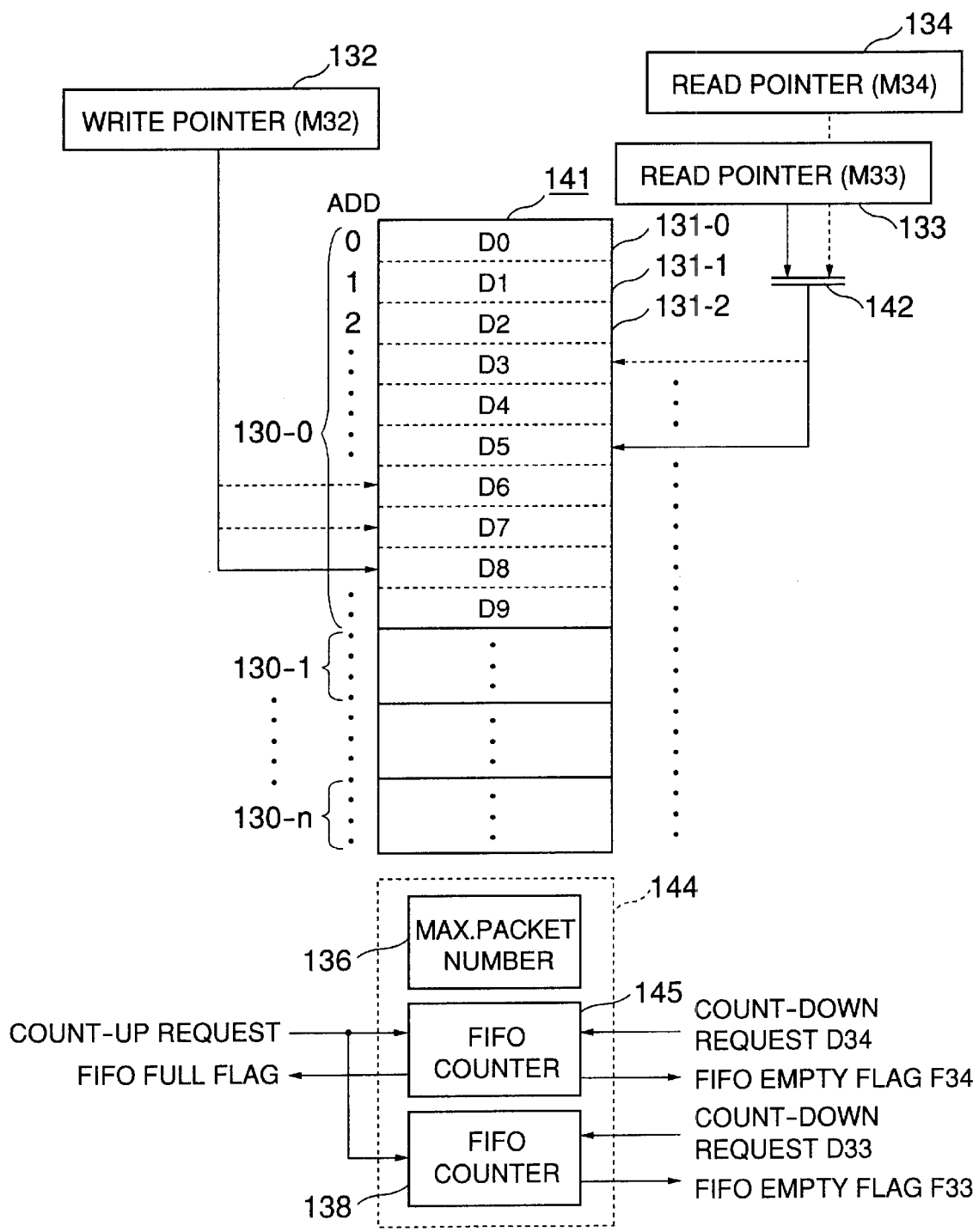
FIG. 15 is a block diagram illustrating the FIFO circuit according to an eighth embodiment of the present invention.

A description will now be given of the FIFO circuit according to an eighth embodiment of the present invention. The FIFO circuit according to the eighth embodiment of the present invention is conceptually shown in FIG. 15. Referring to FIG. 15, the FIFO circuit has the memory portion 141 provided with the one write port and one read port substituted for the memory portion 129, provided with one write port and two read ports, of the FIFO circuit according to the seventh embodiment shown in FIG. 14. The arbiter 142 is provided between the read pointers 133 and 134 and the memory portion 141. The arbiter 142 arbitrates read address requests from the master M33 to which the read pointer 133 is assigned and read access requests from the master M34 to which the read pointer 134 is assigned. Other parts of the structure are the same as those of the FIFO circuit according to the seventh embodiment shown in FIG. 14.

In the FIFO circuit according to the eighth embodiment shown in FIG. 15, the number of read ports of the memory portion 141 is less than the number of read pointers. However, since the arbiter 142 is provided, the write and read operations of the memory portion 141 may be controlled so that an address specified by the master M32 using the write pointer 132 does not exceed an address specified by the master M34 using the read pointer 134 under the condition in which the master M34 executes the read access for each data item after the read access for the same data item of the master M33. In this case, the masters M33 and M34 to which the read pointers 133 and 134 are respectively assigned can use the same data items.

Thus, according to the FIFO circuit according to the eighth embodiment, data items stored in the FIFO circuit packet by packet can be reused without spoiling a function, of the FIFO, that data items input to the memory portion 141 are output in the inputting order. The read accesses for the word storage areas in each of the packet storage areas can be executed at random.

In addition, the FIFO circuits according to the seventh and eighth embodiments, the FIFO counters 145 and 138 are initially set at zero. However, the FIFO counters 145 and 138 may be initially set at a value equal to the maximum number of packets set in the maximum number setting register 136.

In this case, every time a count-down request is received from the master M32 to which the write pointer 132 is assigned, the FIFO counter 145 is decremented (the count-down operation is performed). Every time a count-up request is received from the master M34 to which the read pointer 134 is assigned, the FIFO counter 145 is incremented (the count-up operation is performed). When the count value of the FIFO counter 145 becomes zero, that is, when the memory portion 129 or 141 is filled with data items (in the full state) for the master M32 to which the write pointer 132 is assigned, the FIFO counter 145 outputs the full flag to the master M32. On the other hand, when the value of the FIFO counter 145 reaches a value equal to the maximum number of packets, that is, when the memory portion 129 or 141 becomes empty for the master M34 to which the read pointer 134 is assigned, the FIFO counter 145 outputs the empty flag F34 to the master M34.

In addition, every time a count-down request is received from the master M32 to which the write pointer 132 is assigned, the FIFO counter 138 is decremented (the count-down operation is performed). Every time a count-up request is received from the master M33 to which the read pointer 133 is assigned, the FIFO counter 138 is incremented (the count-up operation is performed). When the count value of the FIFO counter 138 reaches a value equal to the maximum number of packets, that is, when the memory portion 129 or 141 becomes the empty state for the master M33 to which the read pointer 133, the FIFO counter 138 outputs the empty flag F33 to the master M33.

Further, in the first through eighth embodiments of the present invention, two read pointers are provided for the FIFO circuit. However, three or more read pointers may be provided for the FIFO circuit according to the present invention.

Figure 16:
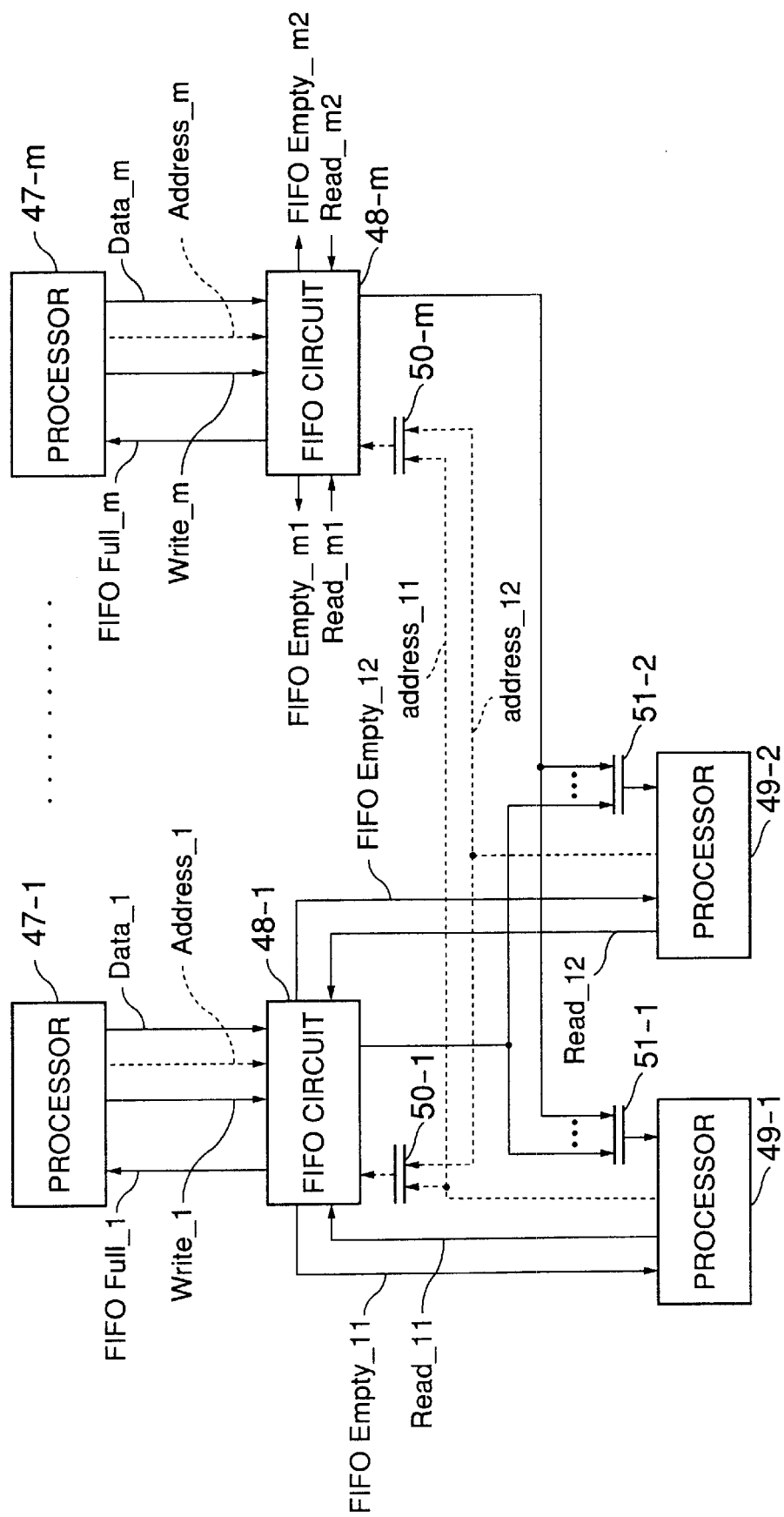
FIG. 16 is a block diagram illustrating a multi processor system to which one of the FIFO circuits shown in FIGS. 8, 10, 12 and 14 is applied.

The multi processor systems according to the first and second embodiments have been described before the above detailed description of the FIFO circuit. Further, a description will now be given of the multi processor system using the FIFO circuits according to one of the first, third, fifth and seventh embodiments as described above. The multi processor system according to a third embodiment of the present invention is shown in FIG. 16. Referring to FIG. 16, the multi processor system has a plurality of processors 47-1 through 47-m, FIFO circuits 48-1 through 48-m, processors 49-1 and 49-2 and selectors 50-1 through, 50-m, 51-1 and 51-2.

The processors 47-1 through 47-m execute instructions in parallel. Each of the FIFO circuits 48-1 through 48-m stores output data from a corresponding one of the processors 47-1 through 47-m. The FIFO circuit according to one of the first, third, fifth and seventh embodiments of the present invention (see FIGS. 8, 10, 12 and 14) is used as each of the FIFO circuits 48-1 through 48-m.

The processors 49-1 and 49-2 executes predetermined processes for output data items, stored in the FIFO circuits 48-1 through 48-m, of the respective processors 47-1 through 47-m. Each of the selectors 50-1 and 50-2 selects either an address__11 from the processor 49-1 or an address__12 from the processor 49-2. The selected address__ 11 or __12 is supplied to each of the FIFO circuits 48-1 and 48-m. The selectors 51-1 and 51-2 select an output data item from among the output data items stored in the respective FIFO circuits 48-1 through 48-m. The selected data item is supplied to each of the processors 49-1 and 49-2.

In addition, a write control signal (Write__1), an address (Address__1) and data (Data__1) are supplied from the processor 47-1 to the FIFO circuit 48-1. The full flag (FIFO Full__1) is output from the FIFO 48-1 to the processor 47-1.

A read control signal (Read__11) is supplied from the processor 49-1 to the FIFO 48-1. The empty flag (FIFO Empty__11) is output from the FIFO 48-1 to the processor 49-1.

In addition, a read control signal (Read__12) is supplied from the processor 49-2 to the FIFO 48-1. The empty flag (FIFO Empty__12) is output from the FIFO 48-1 to the processor 49-2.

A write signal (Write__m), an address (Address__m) and data (Data__m) are supplied from the processor 47-m to the FIFO circuit 48-m. The full flag (FIFO Full__m) is output from the FIFO 48-m to the processor 47-m.

In addition, a read control signal (Read__m1) is supplied from the processor 49-1 to the FIFO circuit 48-m. The empty flag (FIFO Empty__m1) is output from the FIFO circuit 48-m to the processor 49-1.

A read control signal (Read__m2) is supplied from the processor 49-2 to the FIFO circuit 48-m. The empty flag (FIFO Empty__m2) is output from the FIFO circuit 48-m to the processor 49-2.

Each of the processors 47-k (k=1~m) is provided with an instruction for stopping execution of instructions after the full flag (FIFO Full__k) is output from the FIFO circuit 48-k.

In addition, each of the processors 49-1 and 49-2 is provided with an instruction for stopping execution of instructions after the empty flag is output from the FIFO circuit 48-k (k=1, 2, . . . m).

In the multi processor system, having the above structure, according to the third embodiment of the present invention, the processor 47-1 executes instructions in a state where the FIFO circuit 48-1 does not output the full flag (FIFO Full__1) and transmits the write control signal (Write__1), an address (Address__1) and output data (Data__1) to the FIFO circuit 48-1.

When the FIFO circuit 48-1 becomes in the full state, the FIFO circuit 48-1 outputs the full flag (FIFO Full__1) to the processor 47-1. The processor 47-1 then stops the execution of instructions thereafter and waits for the full flag to be released.

In a state where the FIFO circuit 48-1 does not output the empty flag (FIFO Empty__11), the processor 49-1 supplies the read control signal (Read__11) and an address (Address__ 11) to the FIFO circuit 48-1 and reads data from the FIFO circuit 48-1. The processor 49-1 can thus use the data supplied from the processor 47-1 via the FIFO circuit 48-1.

When the FIFO circuit 48-1 becomes in the empty state, the FIFO circuit 48-1 outputs the empty flag (FIFO Empty__ 11) to the processor 49-1. The processor 49-1 thus stops the execution of instructions thereafter and waits for the empty flag (FIFO Empty__11) to be released.

The processor 49-2 can reuse the output data, from the processor 47-1, stored in the FIFO 48-1 which output data was used by the processor 49-1. In such a case, the processor 49-2 supplies the read control signal (Read__12) and an address (Address__12) to the FIFO circuit 48-1 to read the data from the FIFO 49-1.

When the FIFO circuit 48-1 becomes the empty state, the FIFO circuit 48-1 outputs the empty flag (Empty__12) to the processor 49-2. The processor 49-2 which receives the empty flag (Empty__12) stops the execution of instructions thereafter and is waiting for the empty flag (Empty__12) to be released.

In a case where the processor 49-2 first executes the read operation with respect to the FIFO circuit 48-1, the output data, from the processor 47-1, stored in the FIFO circuit 48-1 can be also reused by the processor 42-1.

The above matters are also applied to relationships between the processors 49-1 and 49-2 and other FIFO circuits 48-2 through 48-m.

As has been described above, according to the multi processor system according to the third embodiment, since one of the FIFO circuits according to the first, third, fifth and seventh embodiments is used as each of the FIFO circuits 48-1 through 48-m, the processors 49-1 and 49-2 can use the data stored in each of the FIFO circuits 48-1 through 48-m. That is, the common memory is not needed in order that the processors 49-1 and 49-2 use the same data. As a result, the data transmission and data processing can be executed at a high speed.

Figure 17:
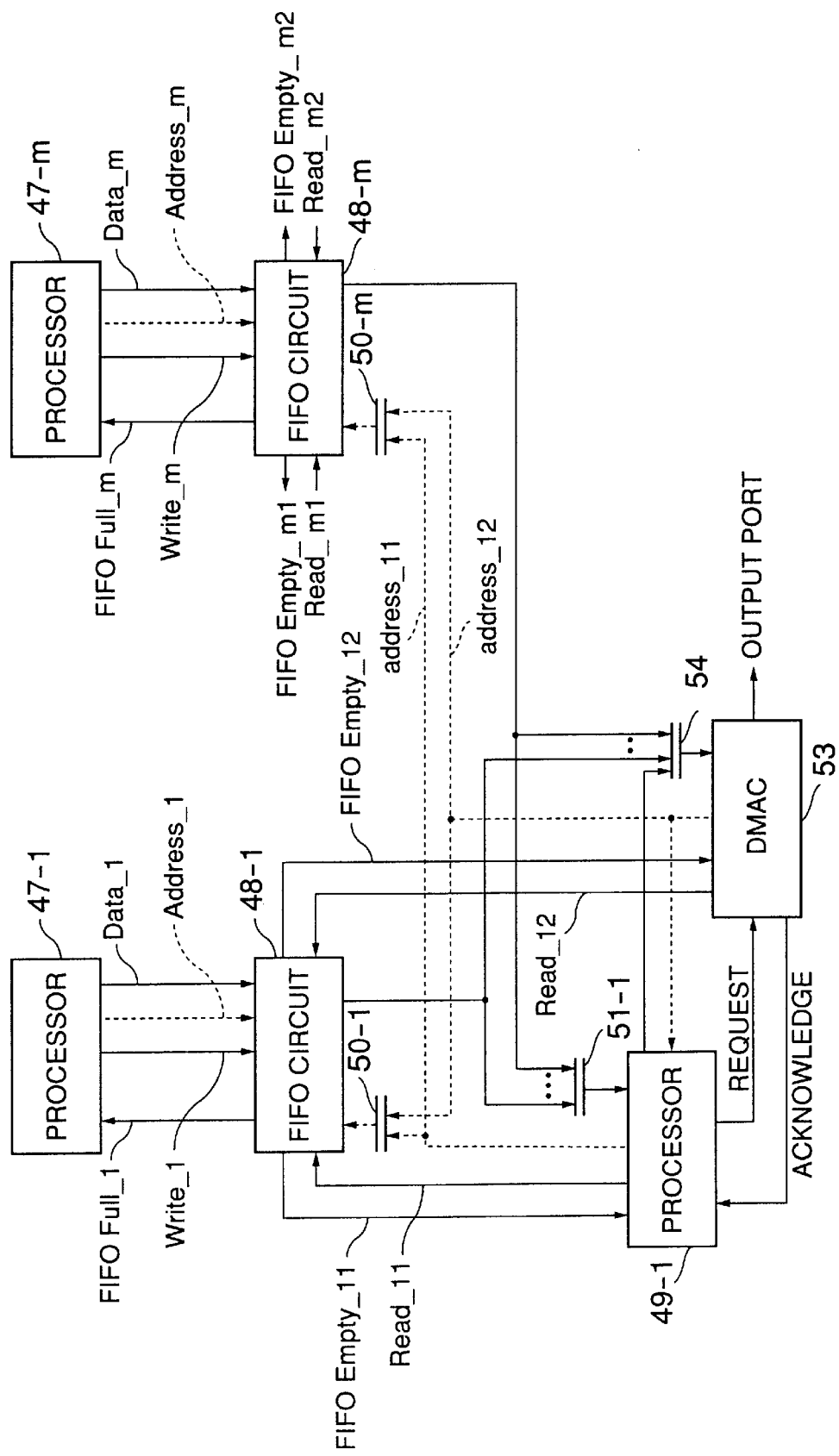
FIG. 17 is a block diagram illustrating a multi processor system to which one of the FIFO circuits shown in FIGS. 9, 11, 13 and 15.

A description will now be given of the multi processor system according to a fourth embodiment of the present invention. The multi processor system according to the fourth embodiment of the present invention is shown in FIG. 17. In the multi processor system shown in FIG. 17, a DMA controller 53 and a selector 54 are substituted for the processor 49-2 and the selector 51-2 shown in FIG. 16.

The selector 54 selects, as a data output terminal to be specified by the DMA controller 53, one of the data output terminals of the FIFO circuits 48-1 through 48-m and processor 49-1.

The processor 49-1 supplies a request signal (Request) to the DMA controller 53. The request signal indicates which output data item out of output data items, from the processors 47-1 through 47-m, stored in the FIFO circuits 48-1 through 48-m and from the processor 49-1 should be transmitted to the output port. The DMA controller 53 supplies an acknowledge signal (Acknowledge) to the processor 49-1 in response to the request signal (Request).

The FIFO circuit according to one of the second, fourth, sixth and eighth embodiments described above is used as each of the FIFO circuits 48-1 through 48-m.

In the multi processor system having the above structure, the processor 49-1 executes a predetermined process for the output data, from the processor 47-k, stored in the FIFO circuit 48-k. Based on the result obtained in the predetermined process, the processor 49-1 supplies to the DMA controller 53 the request signal (Request) indicating whether the output data, from the processor 47-k, stored in the FIFO circuit 48-k or the output data of the processor 49-1 should be transmitted to the output port. The DMA controller 53 transmits the requested output data to the output port.

As has been described above, according to the multi processor system according to the fourth embodiment, since the FIFO circuit according to one of the second, fourth, sixth and eighth embodiments as described above is used as each of the FIFO circuits 48-1 through 48-m, the DMA controller 53 can reuse the data of the processors 47-1 through 47-m which data has been used by the processor 49-1 without providing the common memory. Thus, the data transmission and data processing can be executed at a high speed.

The present invention is not limited to the aforementioned embodiments, and other variations and modifications may be made without departing from the scope of the claimed invention.

The present application is based on Japanese priority application Nos. 10-239314 and 10-240792 filed on Aug. 26, 1998, the entire contents of which are hereby incorporated by reference.

What is claimed is:

1. A multi processor system comprising:
   a first processor, having a data input terminal and a data output terminal, which first processor is programmed so as to decide destinations to which data items successively input from an input terminal thereto should be delivered and deliver the input data items to the decided destinations, the first processor connected to a data memory;
   a plurality of second processors, each of which has a data input terminal and a data output terminal and is programmed so as to execute a predetermined process on data items delivered from said first processor, each of the plurality of second processors connected to the data memory;
   a third processor having a data input terminal and a data output terminal, the input terminal coupled to each of the plurality of second processors; and
   an output data transmission unit that transmits to an output port a data item selected from output data items from said plurality of second processors and an output data item from said third processor, wherein said third processor is programmed so as to execute a predetermined process on each of the output data items from said plurality of second processors connected to the data memory, and inform said output data transmission unit, based on a result obtained in said predetermined process, which output data item is to be transmitted to the output port.

2. The multi processor system as claimed in claim 1 further comprising:
   a data memory, wherein said first processor is further programmed so as to deliver a predetermined data item to said data memory, and wherein each of said second processors is further programmed so as to execute the predetermined process on the data delivered from said first processor with reference to the data stored in said data memory as required.

3. The multi processor system as claimed in claim 1 further comprising:

a first FIFO circuit provided on an input side of said first processor, which first FIFO circuit stores the input data items successively input from an input port;
   a plurality of second FIFO circuits, each of which is provided on a input side of one of said plurality of second processors, which plurality of second FIFO circuits store the input data items to be delivered from said first processor to said plurality of second processors;
   a plurality of third FIFO circuits each of which is provided on an output side of one of said plurality of second processors and stores the output data item from said one of said plurality of second processors; and
   a fourth FIFO circuit, provided on an output side of said third processor, which fourth FIFO circuit stores the output data item from said third processor.

4. The multi processor system as claimed in claim 3, wherein each of said plurality of third FIFO circuits is provided with a write pointer, a first read pointer and a second read pointer, wherein said write pointer is assigned to a corresponding one of said plurality of second processors, said first read pointer is assigned to said third processor, and said second read pointer is assigned to said output data transmission unit.

5. The multi processor system as claimed in claim 4, wherein each of said plurality of second processors is provided with an instruction for updating a counter of a corresponding one of said plurality of second FIFO circuits, an instruction for stopping execution of instructions when a corresponding one of said plurality of second FIFO circuits is in an empty state, and an instruction for stopping execution of instructions when a corresponding one of said plurality of third FIFO circuit is in a full state.

6. The multi processor system as claimed in claim 1, wherein said output data transmission unit is a direct memory access controller.

7. A FIFO circuit comprising:
   a memory portion;
   one write pointer assigned to a first master which is programmed to execute a predetermined process for input data stored in a corresponding FIFO circuit; and
   a plurality of read pointers each of which is assigned to one of a plurality of second masters, a first read pointer is assigned to a processor which reads output data from a corresponding FIFO circuit, and a second read pointer is assigned to a DMA controller which reads output data from a corresponding FIFO circuit.

8. The FIFO circuit as claimed in claim 7 further comprising:
   a first FIFO counter, initially set at zero, which first FIFO counter is incremented in response to a count-up request from said first master and decremented in response to a count-down request from one of said plurality of second masters which one executes a read access operation for each of data items last, wherein said first FIFO counter outputs a full flag to said first master when a count value of said first FIFO counter reaches a maximum value; and
   a plurality of second FIFO counters each of which corresponds to one of said plurality of second masters, each of said plurality of second FIFO counter being initially set at zero, incremented in response to a count-up request from said first master and decremented in response to a count-down request from a corresponding one of said plurality of second masters, wherein each of said plurality of second FIFO counter outputs an empty flag to the corresponding one of said plurality of second masters when a count value thereof becomes zero.

9. The FIFO circuit as claimed in claim 8 further comprising:
a first FIFO counter, initially set at zero, which first FIFO counter is incremented in response to a count-up request from said first master and decremented in response to a count-down request from one of said plurality of second masters which one executes a read access operation for each of data items last, wherein said first FIFO counter outputs a full flag when a count value of said first FIFO counter reaches a maximum value and outputs an empty flag when the count value of said first FIFO counter becomes zero; and
a plurality of second FIFO counters each of which corresponds to one of remaining second masters, each of said plurality of second FIFO counters being initially set at zero, incremented in response to a count-up request from said first master and decremented in response to a count-down request from a corresponding one of said remaining second masters, wherein each of said plurality of second FIFO counters outputs an empty flag to the corresponding one of said remaining second masters when a count value thereof becomes zero.

10. The FIFO circuit as claimed in claim 7 further comprising:
a first FIFO counter, initially set at a maximum value, that is decremented in response to a count-down request from said first master and incremented in response to a count-up request from one of said second masters which one executes a read access operation for each of data items last, wherein said first FIFO outputs a full flag to said first master when a count value of said first FIFO counter becomes zero; and
a plurality of second FIFO counters each of which corresponds to one of said plurality of second masters, each of said plurality of second FIFO counters being initially set at the maximum value, decremented in response to a count-down request from said first master and incremented in response to a count-up request from a corresponding one of said plurality of second masters, wherein each of said plurality of second FIFO counters outputs an empty flag to the corresponding one of said plurality of second masters when a count value thereof reaches the maximum value.

11. The FIFO circuit as claimed in claim 7 further comprising:
a first FIFO counter, initially set at a maximum value, which first FIFO counter is decremented in response to a count-down request from said first master and incremented in response to an count-up request from one of said plurality of second masters which one executes a read access operation for each of data items last, wherein said first FIFO counter outputs a full flag when a count value of said first FIFO counter becomes zero and outputs an empty flag when the count value of said first FIFO counter reaches the maximum value; and
a plurality of second FIFO counters each of which corresponds to one of remaining second masters, each of said plurality of second FIFO counters being initially set at the maximum value, decremented in response to a count-down request from said first master and incremented in response to a count-up request from a corresponding one of said remaining second masters,
wherein each of said plurality of second FIFO counters outputs an empty flag to the corresponding one of said remaining second masters when a count value thereof reaches the maximum value.

12. The FIFO circuit as claimed in claim 8, wherein said first master and said plurality of second masters execute the count-up request and count-down request for each word, and wherein said FIFO circuit further comprises:
a maximum number setting unit in which a maximum number of words capable of being stored in said memory portion is set, the maximum value being equal to the maximum number of words.

13. The FIFO circuit as claimed in claim 9, wherein said first master and said plurality of second masters execute the count-up request and count-down request for each word, and wherein said FIFO circuit further comprises:
a maximum number setting unit in which a maximum number of words capable of being stored in said memory portion is set, the maximum value being equal to the maximum number of words.

14. The FIFO circuit as claimed in claim 10, wherein said first master and said plurality of second masters execute the count-up request and count-down request for each word, and wherein said FIFO circuit further comprises:
a maximum number setting unit in which a maximum number of words capable of being stored in said memory portion is set, the maximum value being equal to the maximum number of words.

15. The FIFO circuit as claimed in claim 11, wherein said first master and said plurality of second masters execute the count-up request and count-down request for each word, and wherein said FIFO circuit further comprises:
a maximum number setting unit in which a maximum number of words capable of being stored in said memory portion is set, the maximum value being equal to the maximum number of words.

16. The FIFO circuit as claimed in claim 8, wherein said first master and said plurality of second masters execute the count-up request and count-down request for each packet, and wherein said FIFO circuit further comprises:
a maximum number setting unit in which a maximum number of packets capable of being stored in said memory portion is set, the maximum value being equal to the maximum number of packets.

17. The FIFO circuit as claimed in claim 9, wherein said first master and said plurality of second masters execute the count-up request and count-down request for each packet, and wherein said FIFO circuit further comprises:
a maximum number setting unit in which a maximum number of packets capable of being stored in said memory portion is set, the maximum value being equal to the maximum number of packets.

18. The FIFO circuit as claimed in claim 10, wherein said first master and said plurality of second masters execute the count-up request and count-down request for each packet, and wherein said FIFO circuit further comprises:
a maximum number setting unit in which a maximum number of packets capable of being stored in said memory portion is set, the maximum value being equal to the maximum number of packets.

19. The FIFO circuit as claimed in claim 11, wherein said first master and said plurality of second masters execute the count-up request and count-down request for each packet, and wherein said FIFO circuit further comprises:
a maximum number setting unit in which a maximum number of packets capable of being stored in said memory portion is set, the maximum value being equal to the maximum number of packets.

20. The FIFO circuit as claimed in claim 7, wherein a number of read ports of said memory portion is less than a number of said plurality of second masters, and wherein said FIFO circuit further comprises:

an arbiter that arbitrates read accesses with respect to said memory portion from said plurality of second masters.

21. A multi processor system comprising:

a plurality of first processors that execute processes in parallel;

a plurality of FIFO circuits each of which corresponds to one of said plurality of first processors and stores an output data items from a corresponding one of said plurality of first processors; and a plurality of second processors that process output data items from said plurality of second FIFO circuits, wherein each of said plurality of FIFO circuits comprises:

a memory portion;

a write pointer assigned to a corresponding one of said first processors which is programmed to execute a predetermined process for input data stored in a corresponding FIFO circuit; and a plurality of read pointers each of which is assigned to one of said plurality of second processors, a first read pointer is assigned to a processor which reads output data from a corresponding FIFO circuit, and a second read pointer is assigned to a DMA controller which reads output data from a corresponding FIFO circuit.

22. The multi processor system as claimed in claim 21, wherein each of said plurality of first processors has an instruction for stopping execution of instructions when the memory portion of a corresponding one of said plurality of FIFO circuits is filled with data items, and wherein each of said plurality of second processors has an instruction for stopping execution of instructions when each of said plurality of FIFO circuits becomes an empty state for said each of said plurality of second processors.

23. The multi processor system as claimed in claim 22, wherein said plurality of second processors includes a control processor and a direct memory access controller, said control processor processing the output data items, from said plurality of said first processors, stored in said plurality of FIFO circuits, and wherein said control processor supplies to said direct memory access controller a request indicating which one of the output data items stored in said plurality of FIFO circuits and an output data item from said control processor should be supplied to an output port.

* * * * *

UNITED STATES PATENT AND TRADEMARK OFFICE
CERTIFICATE OF CORRECTION

PATENT NO. : 6,571,301 B1
DATED : May 27, 2003
INVENTOR(S) : Makoto Nakahara

It is certified that error appears in the above-identified patent and that said Letters Patent is hereby corrected as shown below:

<u>Title page,</u>
Item [57], ABSTRACT,
Line 1, after "processor" insert -- , --;
Line 8, after "so" insert -- as --.

Signed and Sealed this

Eighteenth Day of November, 2003

JAMES E. ROGAN
*Director of the United States Patent and Trademark Office*